US008413051B2

(12) United States Patent
Bacus et al.

(10) Patent No.: US 8,413,051 B2
(45) Date of Patent: Apr. 2, 2013

(54) CONTEXTUALLY PREVIEWING FONTS

(75) Inventors: Mike Bacus, Tigard, OR (US); Tyler Morrison, Corbett, OR (US)

(73) Assignee: Celartem, Inc., Portland, OR (US)

( * ) Notice: Subject to any disclaimer, the term of this patent is extended or adjusted under 35 U.S.C. 154(b) by 519 days.

(21) Appl. No.: 12/582,101

(22) Filed: Oct. 20, 2009

(65) Prior Publication Data

US 2010/0107062 A1 Apr. 29, 2010

Related U.S. Application Data

(60) Provisional application No. 61/106,955, filed on Oct. 20, 2008.

(51) Int. Cl.
*G06F 17/00* (2006.01)

(52) U.S. Cl. ........ 715/269; 715/205; 715/256; 715/768; 715/784

(58) Field of Classification Search .................. 715/200, 715/204, 205, 207, 226, 229, 231, 234, 253, 715/255, 269, 273, 274, 700, 760, 764, 765, 715/767, 784–786, 201, 202, 238, 240, 243, 715/256, 265, 738, 762, 768, 781, 790, 791
See application file for complete search history.

(56) References Cited

U.S. PATENT DOCUMENTS

| | | | |
|---|---|---|---|
| 5,903,905 A * | 5/1999 | Andersen et al. ............ 715/275 |
| 6,285,461 B1 * | 9/2001 | Fujii et al. .................... 358/1.18 |
| 6,330,577 B1 * | 12/2001 | Kim .............................. 715/210 |
| 6,512,531 B1 * | 1/2003 | Gartland ....................... 715/854 |
| 6,587,128 B2 * | 7/2003 | Kanevsky et al. ............ 715/768 |
| 6,687,879 B1 * | 2/2004 | Teshima ........................ 715/210 |
| 6,882,344 B1 * | 4/2005 | Hayes et al. .................. 345/467 |
| 6,901,427 B2 * | 5/2005 | Teshima ........................ 709/203 |
| 7,539,939 B1 * | 5/2009 | Schomer ....................... 715/269 |
| 7,958,448 B2 * | 6/2011 | Fattic et al. ................... 715/269 |
| 2006/0132812 A1 * | 6/2006 | Barnes et al. ................ 358/1.11 |
| 2007/0242072 A1 * | 10/2007 | Fattic et al. ................... 345/471 |
| 2008/0120538 A1 * | 5/2008 | Kurz et al. .................... 715/255 |

* cited by examiner

*Primary Examiner* — Maikhanh Nguyen
(74) *Attorney, Agent, or Firm* — Banner & Witcoff, Ltd.

(57) ABSTRACT

Text may be contextually previewed in various fonts using preview panes with a level of transparency. Fonts or font groups may then be applied to a document using the preview panes. In one example, text to be inserted may be previewed in different fonts against the document in which the text is to be added. Once a user has selected a desirable font, the user may choose to insert the text into the document using the preview pane. Alternatively, a user may apply a font to existing text from the preview pane. Text in fonts of different types and/or sizes may be previewed in a variety of formats in a single preview area and/or with individual font preview panes.

22 Claims, 27 Drawing Sheets

CONTEXTUALLY PREVIEWING FONTS

I. CROSS-REFERENCE TO RELATED APPLICATION

This application claims the benefit of priority and is a non-provisional application of U.S. Provisional Application No. 61/106,955, entitled "CONTEXTUALLY PREVIEWING FONTS," and filed on Oct. 20, 2008.

II. FIELD OF ART

The invention is generally directed to managing fonts, and more particularly to a system and method for contextual previewing fonts.

III. BACKGROUND

Word processing programs, desktop publishing applications, web publishing and other computer programs conventionally allow users to select different fonts for creating and printing documents. As the number of fonts has increased over the years, it has become more difficult for users to manage different fonts. Creative professionals such as web designers, in particular, need to select from among a broad variety of typefaces and other stylistic options when creating documents, advertisements and the like. Although commercially available software packages typically include a nominal number of fonts with the price of the software, users must frequently pay extra money to install additional fonts on a computer.

Computers typically store fonts in separate files that can be added to or deleted from the computer system as desired. By installing additional font files on a computer, the operating system can make the fonts available to programs running on the computer. When a computer user wishes to use a font from within a word processing program, the program queries the operating system for a list of available fonts. The list of available fonts generally does not include an image showing how each font will appear when used in the program. Thus, a user might not know how a font will appear in their document if it is selected. If a large number of fonts is installed on a single computer, the list of fonts can be unwieldy and difficult to manage. In particular, requiring that a user scroll through a list of thousands of fonts is inconvenient and inefficient. Moreover, the operating system consumes additional memory to maintain information regarding the many different installed fonts and overall performance of the operating system can be severely degraded by having too many fonts loaded into memory at the same time.

One conventional approach for managing a large numbers of fonts on a single computer is shown in FIG. 1. A word processing program 101 interacts with an operating system 102 to "enumerate" fonts that are installed on the computer, and the font details are returned to the program 101. Installed fonts 103 may be stored in a font folder and a system registry database that maintains information regarding the fonts. A font installation program 104 can be used to add or delete fonts from the system.

In one conventional approach, a separate font manager application 106 is added to the basic system to configure fonts into separate groups, each of which can then be "activated" by a user. A separate font grouping database 105 stores information regarding a superset of available fonts arranged into groups (e.g., Font Group 1, Font Group 2), and the user operates font manager application 106 to create new groupings and activate a given font group.

When a font group is activated, the font manager application 106 installs fonts from the activated group in the operating systems installed fonts database 103. When a font group is deactivated, font manager application 106 removes fonts from the operating systems installed fonts database 103. Thus, the operating system only maintains knowledge regarding a small subset of the total universe of fonts that can be installed on the computer, and when the user selects fonts from word processing program 101, the operating system returns information only for those fonts that are installed in the operating systems installed font database 103. One product that provides font management capabilities of the type shown in FIG. 1 is the Adobe Type Manager (ATM) Deluxe product sold by Adobe of San Jose, Calif. In an alternate variation of the scheme in FIG. 1, the font retrieval functions of the operating system are replaced with substitute functions that then reference fonts in a grouped database such as database 105 instead of the installed fonts.

Although the font management scheme illustrated in FIG. 1 has greatly simplified the tasks of creative professionals, several factors have led to the need for additional font management features.

Conventional word processing programs permit users to preview a font if the font is active in the operating system and text in the word processing program has been selected and styled with the chosen font in a particular font size. The user may thus have a difficult time knowing what a font will look like in the document by choosing a font by name from a font selection menu in the word processing application, even if the font names in the selection menu are displayed in a what-you-see-is-what-you-get (wysiwyg) format. A word processing application can typically only display in its font selection menu fonts that are active on the operating system, which usually only includes a subset of all available fonts. Even if the font selection is in wysiwyg format, some fonts might not be displayable in such a format because those font might not have the glyphs to display the letters necessary to spell out the name of the font (for example symbol fonts), making it difficult or tedious to compare different fonts on the same display. As shown in FIG. 2, for example, a conventional font selection dialog box 200 allows the user to select one font (e.g., Times New Roman M) 201 from a list of fonts and one font size (e.g., 14 pt) from a list of font sizes, and a corresponding preview window or area 202 shows what that selected font in the specified font size will look like based on a predetermined sentence fragment (e.g., "The Quick Brown Fox . . . "). In order to preview another font (or font size), the user must select a different font (or font size), which will then be previewed in the previewing area 202. Consequently, it is unwieldy to browse through a large number of fonts, and difficult or impossible to compare two different fonts and/or font sizes side by side. Similarly, the conventional font manager application 106 of FIG. 1 only permits the user to preview fonts of one font size at a time.

The increasingly networked nature of computers, both in local area networks and as part of the Internet, has led to configurations under which different users in a collaborative setting (e.g., within a company) may have different and potentially conflicting fonts installed on their computers. Thus, for example, if two graphic artists within a corporation have each selectively activated different groups of fonts on their computers, when one artist sends a document to the other artist, the document may not be capable of being displayed on the second computer because of a non-activated font. Consequently, a need exists for resolving these problems.

III. BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect of the present disclosure, a font preview area is provided where multiple fonts may be viewed simultaneously. Thus, fonts do not need to be globally active on the operating system in order to be previewed. Instead, fonts might only be locally active in the process space of the font manager creating the previews. In addition, a single font in varying font sizes may be viewed concurrently.

According to another aspect of the present disclosure, multiple fonts, each font being displayed in varying sizes may be previewed simultaneously. Additionally or alternatively, fonts may be viewed in different formats such as alphabetically with all standard alphanumeric characters being viewed together. Further, customized text may be previewed using multiple fonts and font sizes simultaneously. According to yet another aspect, text may be previewed in paragraph form.

In yet another aspect of the invention, preview text may be encoding aware. That is, if preview text cannot be rendered because the glyphs necessary to render the preview text do not exist in the font, then an alternative sequence of glyphs will be substituted that are included in the font's set of glyphs.

According to another aspect, a list or menu of available fonts may be shown on a screen, where each font name is displayed in its own font face.

According to another aspect, selection of one or more fonts or groups of fonts from the list or menu of available fonts may spawn preview panes for each selected font or group of fonts. The spawned preview panes may be transparent and overlaid on top of existing desktop publishing applications containing documents, html, text, images, symbols and the like. The preview text or symbols may thus be previewed in context with an underlying document or file in which the text is to be inserted. In some configurations, the preview text or symbols may be maintained as the topmost window on the operating system desktop, allowing previewing of the text or symbols in context without impacting dialog tiling and overlap. With the preview text in place and visible, the end user may continue to edit his/her document using the desktop publishing application with the preview overlay visible.

These and other novel advantages, details, embodiments, features and objects of the disclosure will be apparent to those skilled in the art from following the detailed description, the attached claims and accompanying drawings, listed herein.

III. BRIEF DESCRIPTION OF DRAWINGS

Certain embodiments are illustrated by way of example and not limited in the accompanying figures in which like reference numerals indicate similar elements and in which.

FIGS. 3A-3D respectively illustrate a user interface for previewing fonts a according to one or more aspects described herein.

Figure 4A:
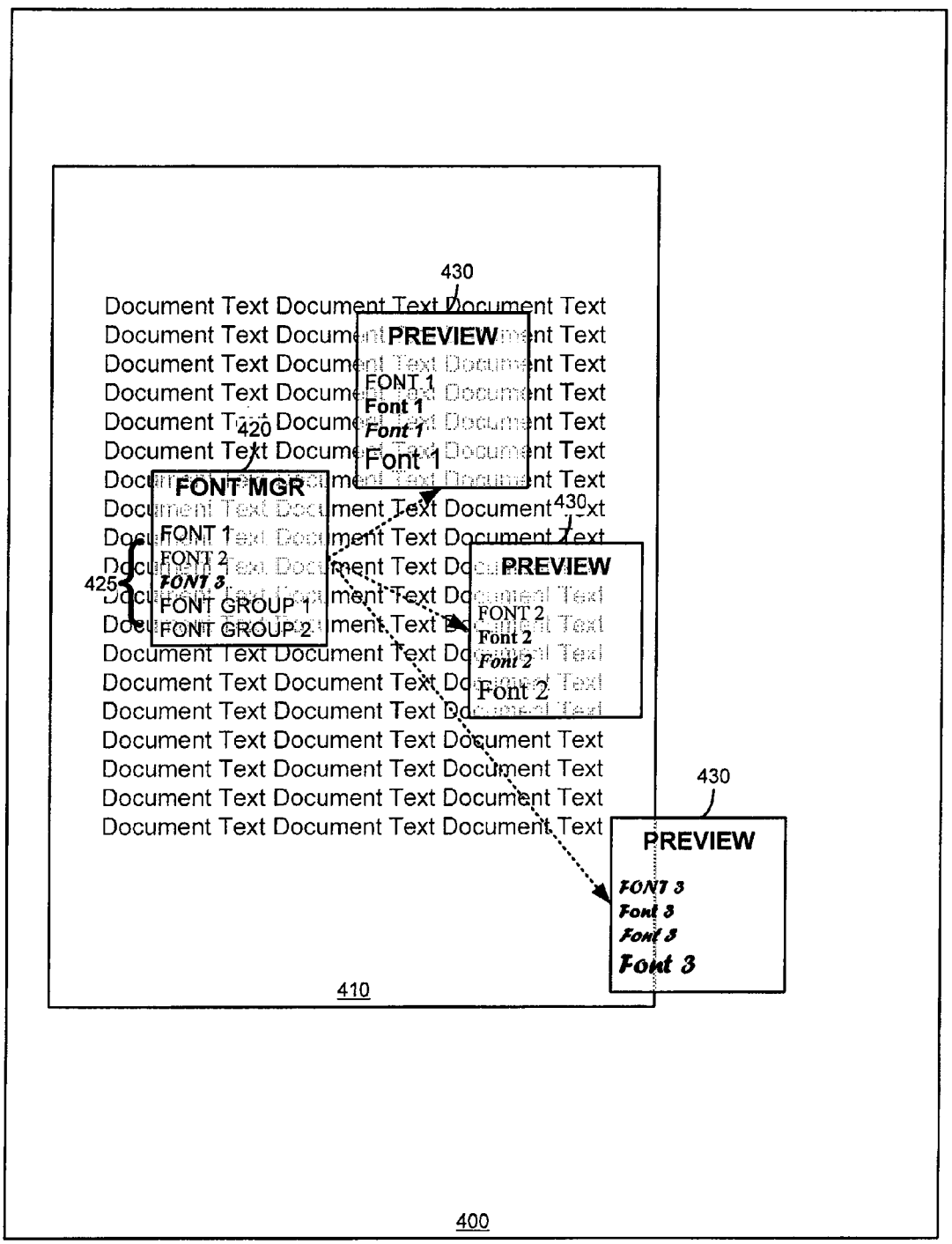
Figure 4B:
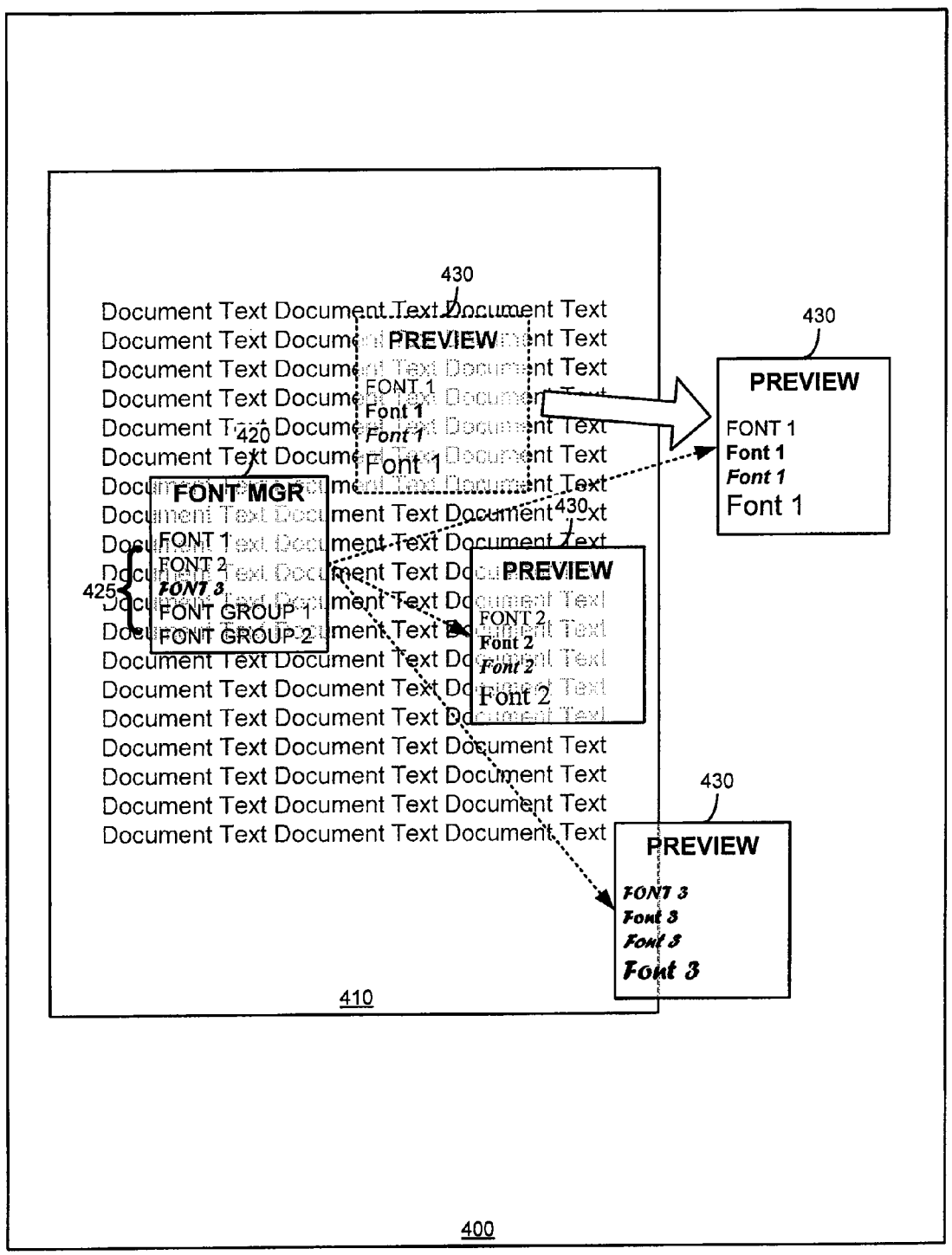
Figure 4C:
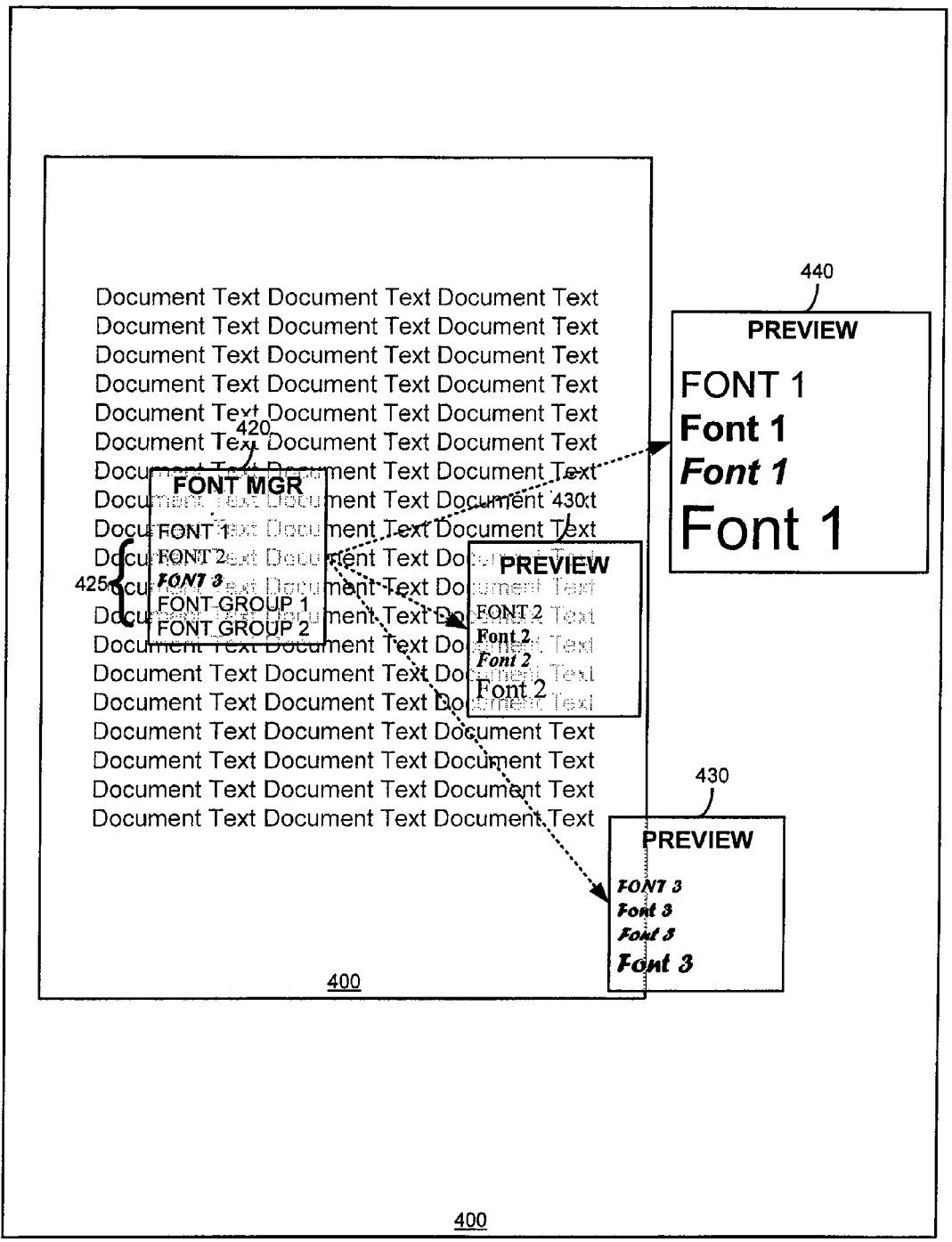

FIGS. 4A-4C show an illustrative user interface for previewing one or more fonts in individual preview panes according to one or more aspects described herein.

Figure 5:
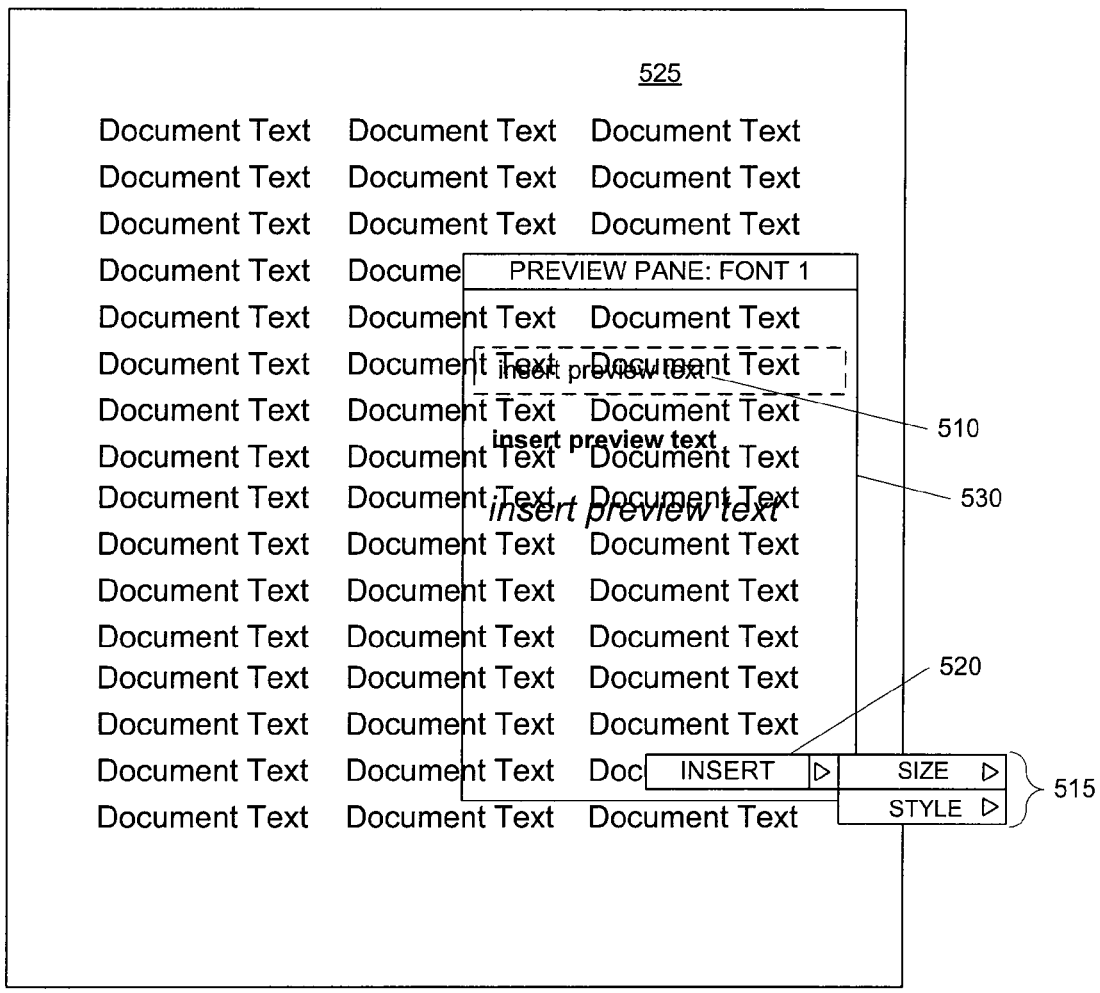

FIG. 5 illustrates a user interface through which a user may insert text into a document according to one or more aspects described herein.

Figure 6A:
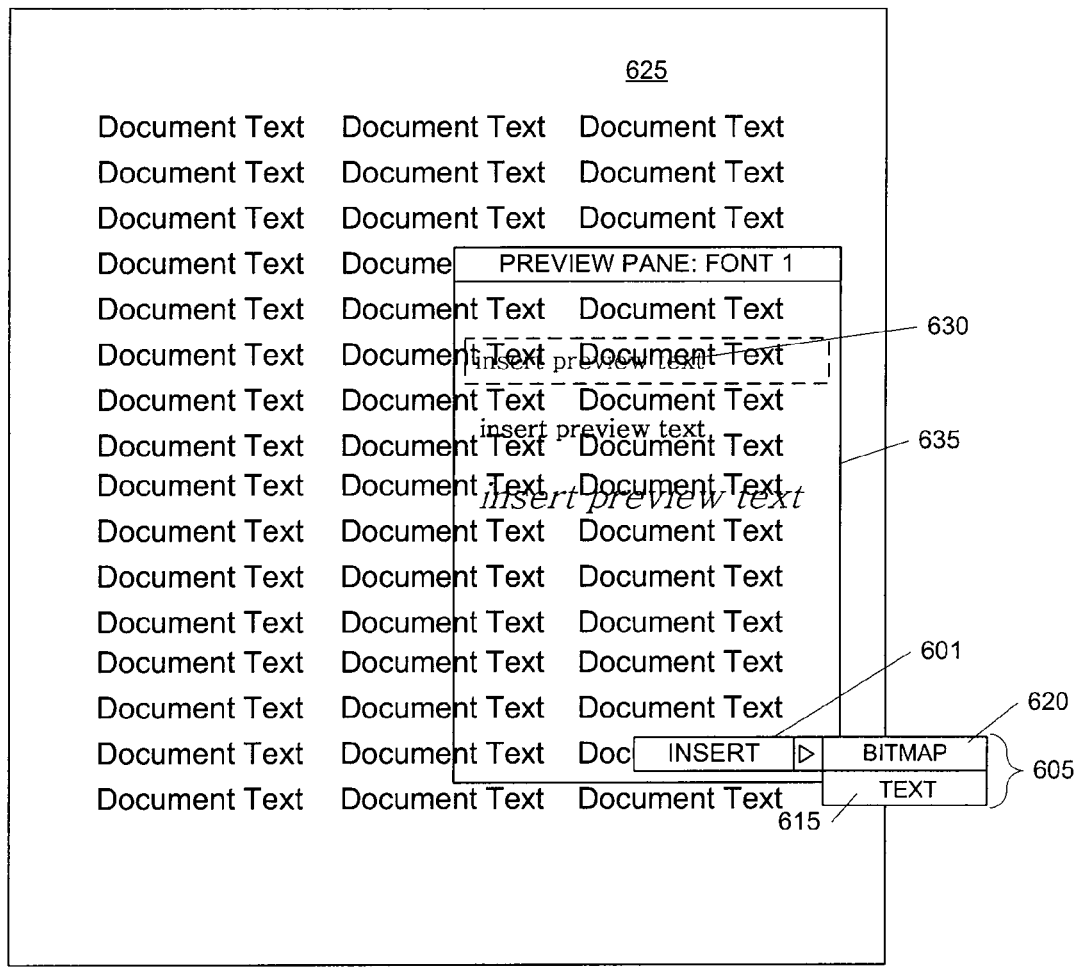
Figure 6B:
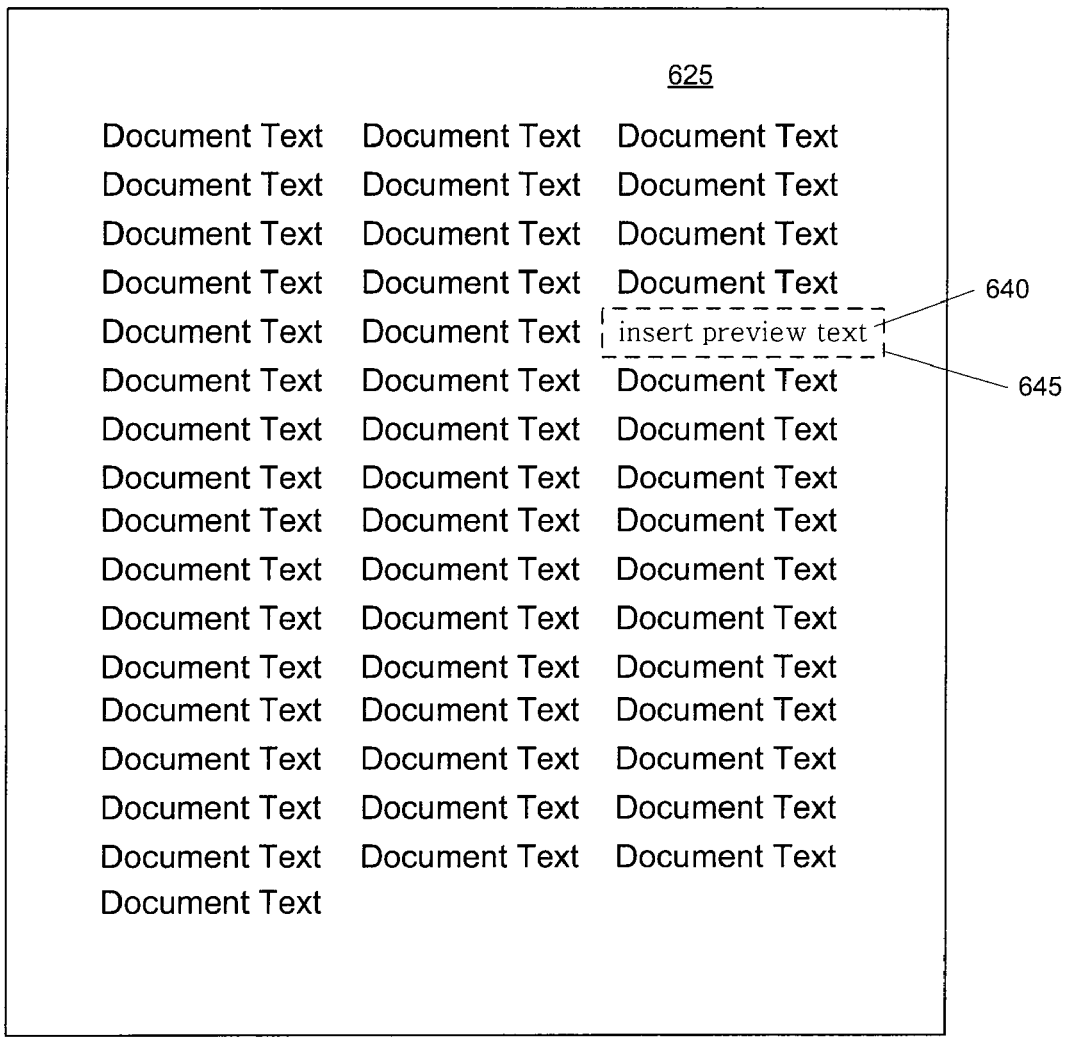

FIGS. 6A and 6B illustrate the insertion of a bitmap into a document according to one or more aspects described herein.

Figure 7:
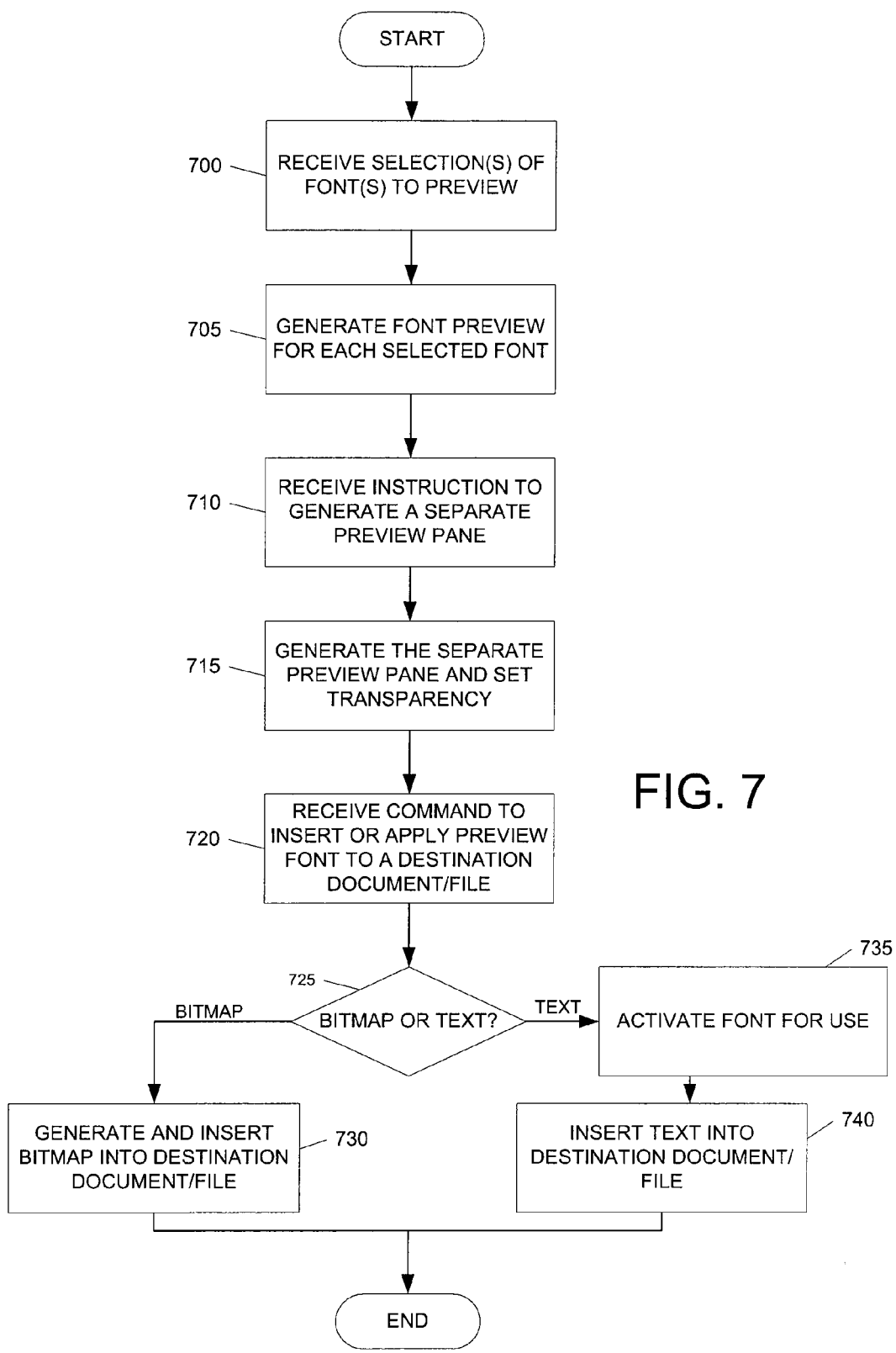

FIG. 7 illustrates a method for contextually previewing text and inserting the previewed text into an underlying document of file according to one or more aspects described herein.

Figure 8:
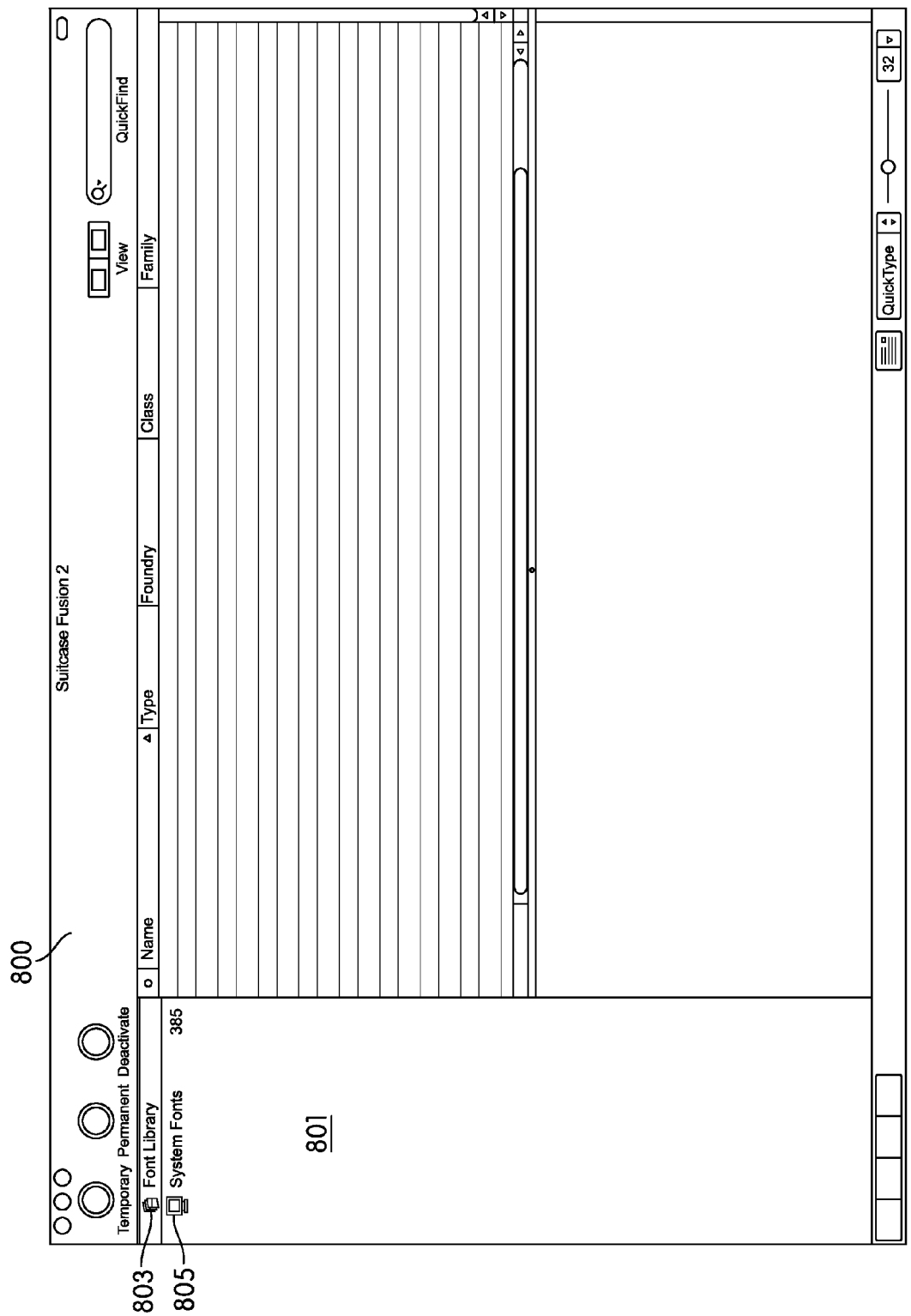
Figure 9:
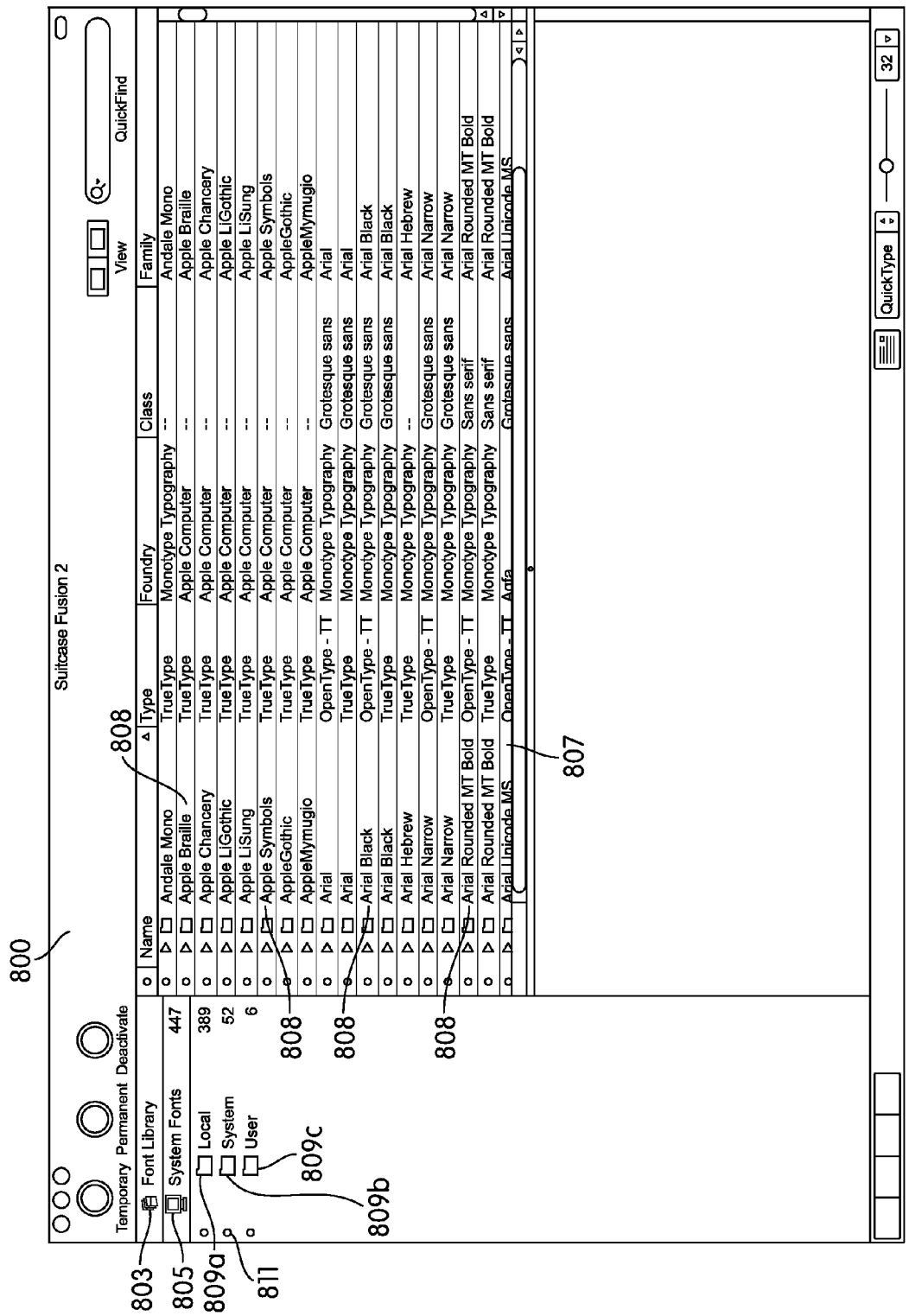
Figure 10:
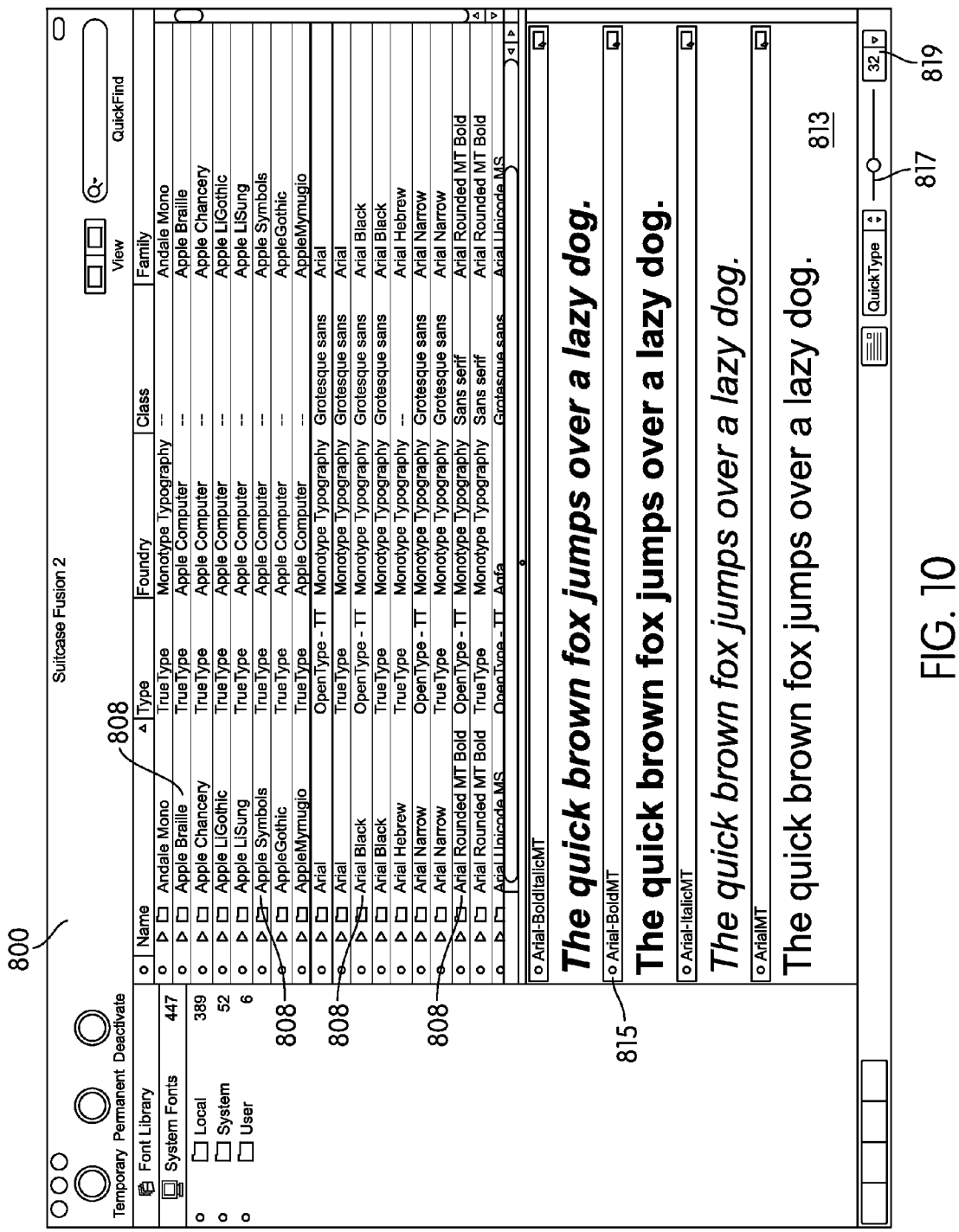

FIGS. 8-10 illustrate an example user interface for browsing and previewing multiple fonts and font styles according to one or more aspects described herein.

Figure 11:
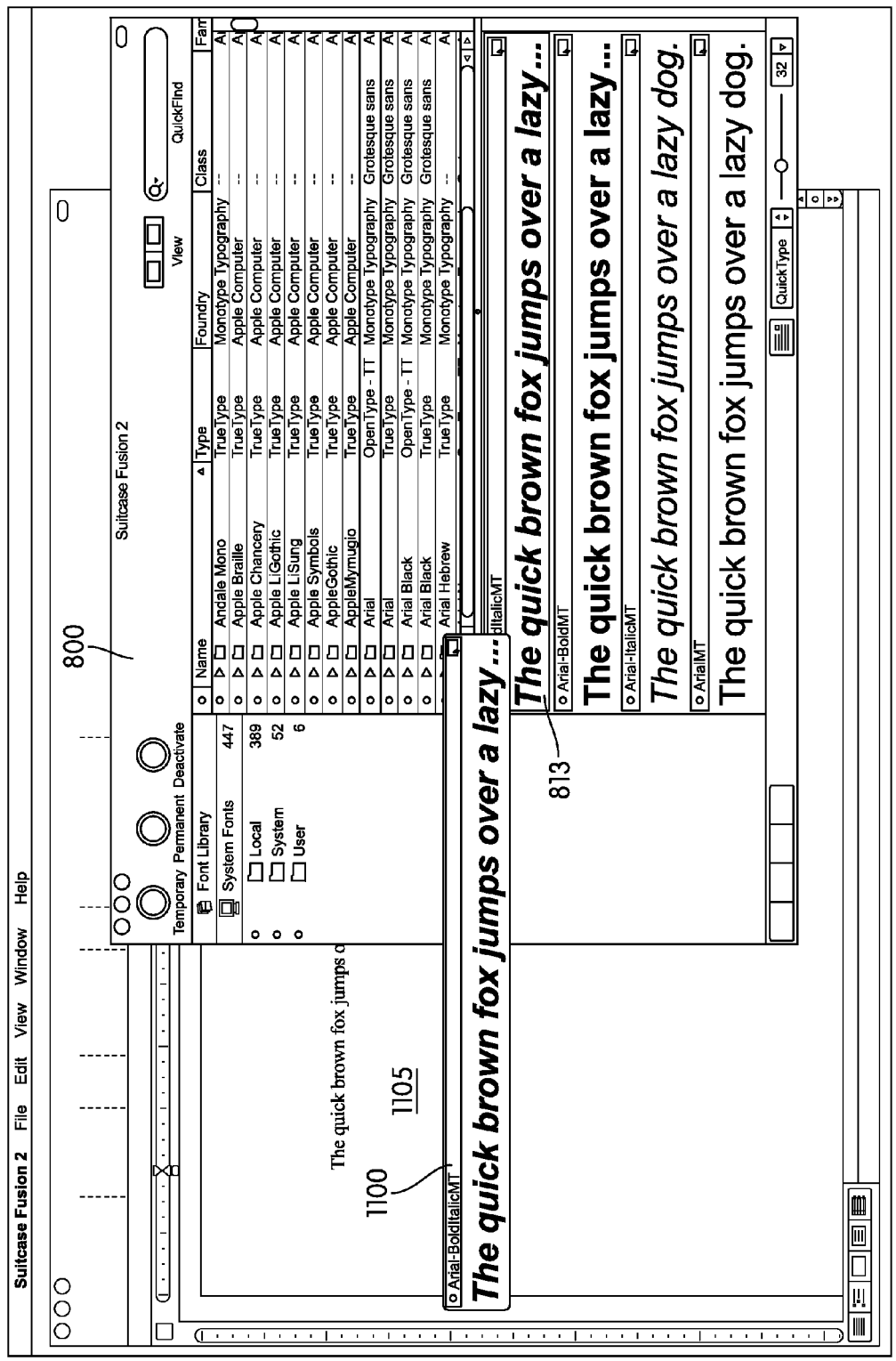

FIG. 11 illustrates an example user interface in which a floating font preview pane is generated from a display area of a font manager window according to one or more aspects described herein.

Figure 12:
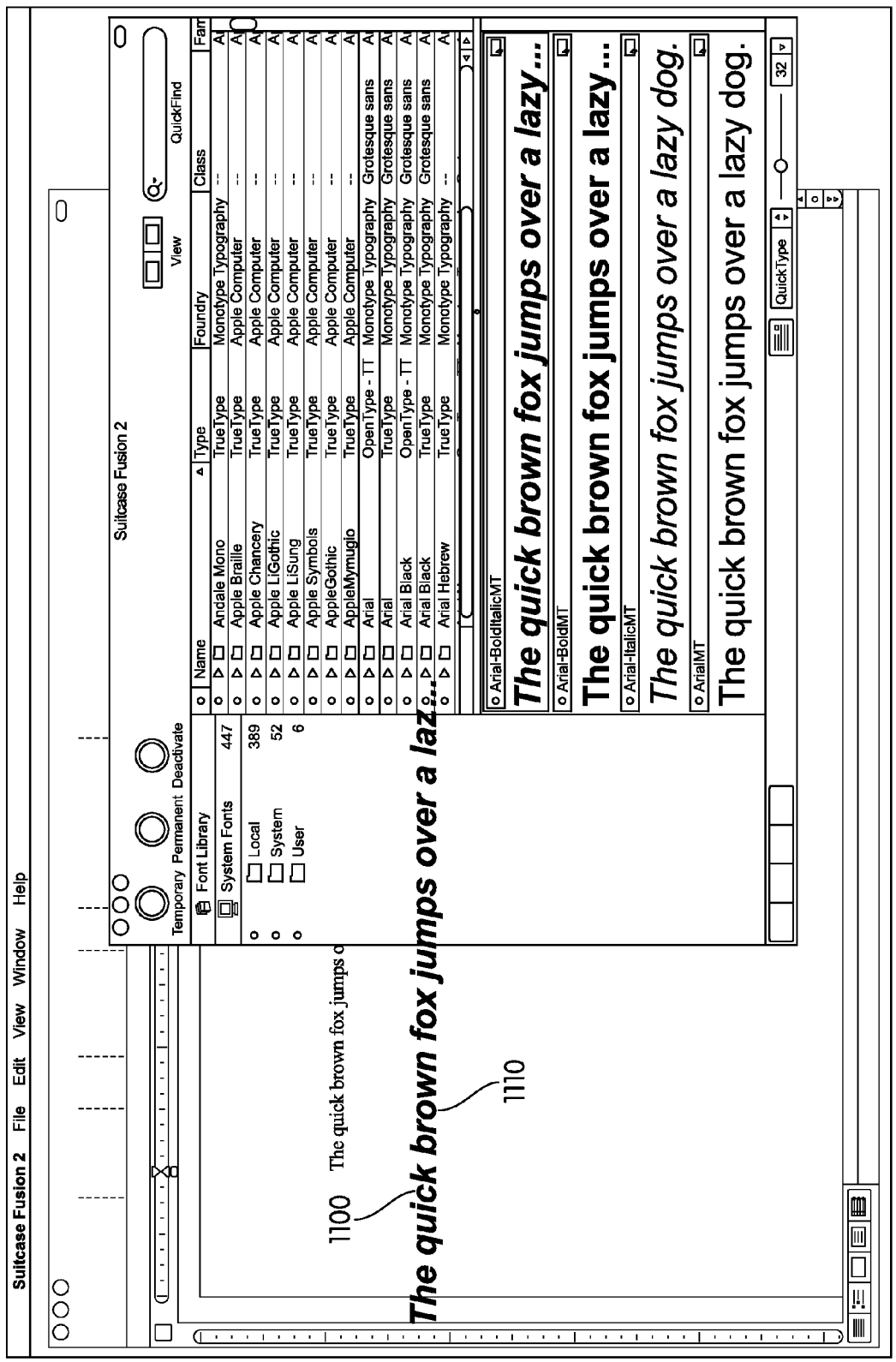

FIG. 12 illustrates a floating font preview pane in a transparent state according to one or more aspects described herein.

Figure 13:
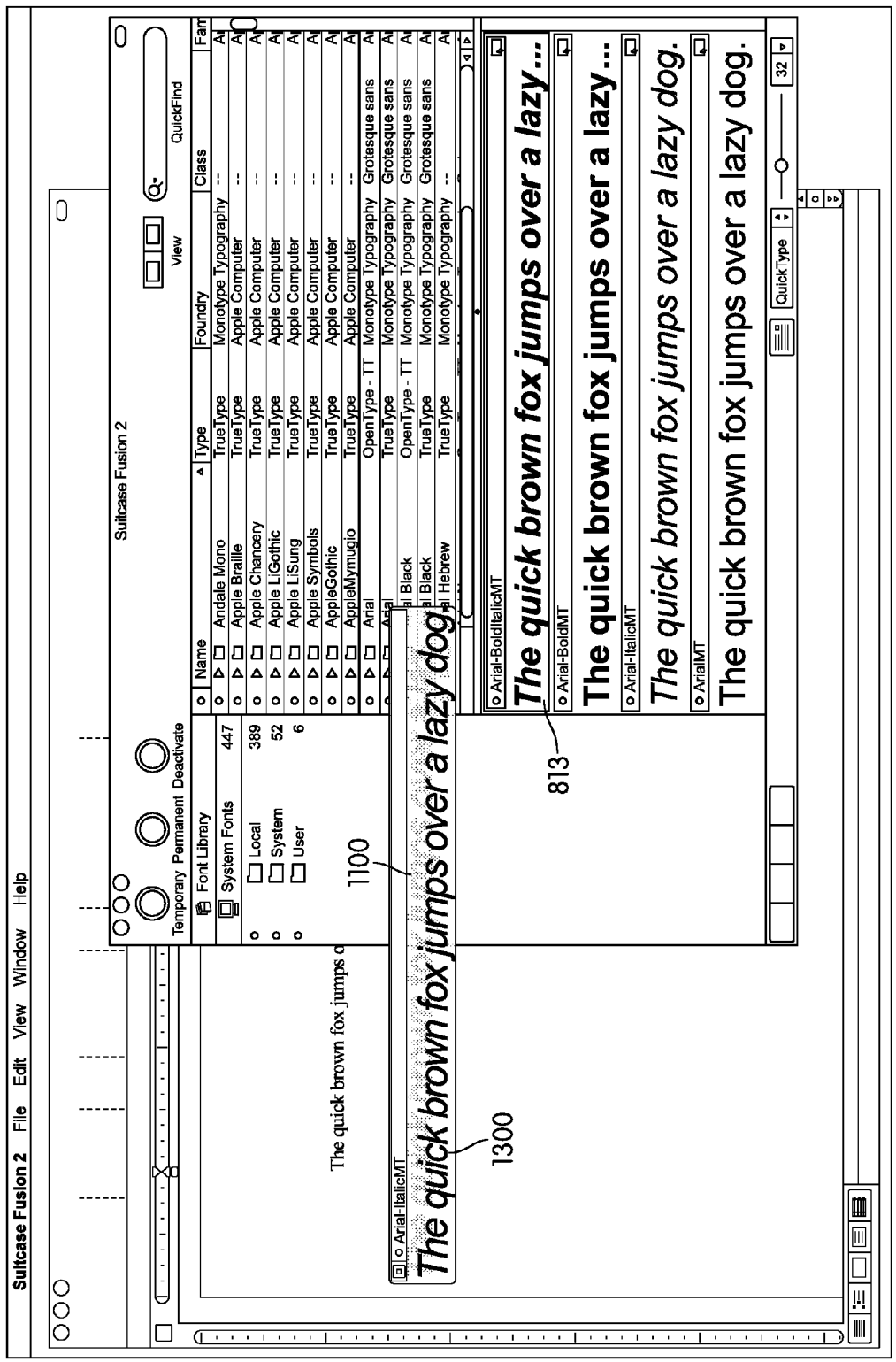
Figure 14:
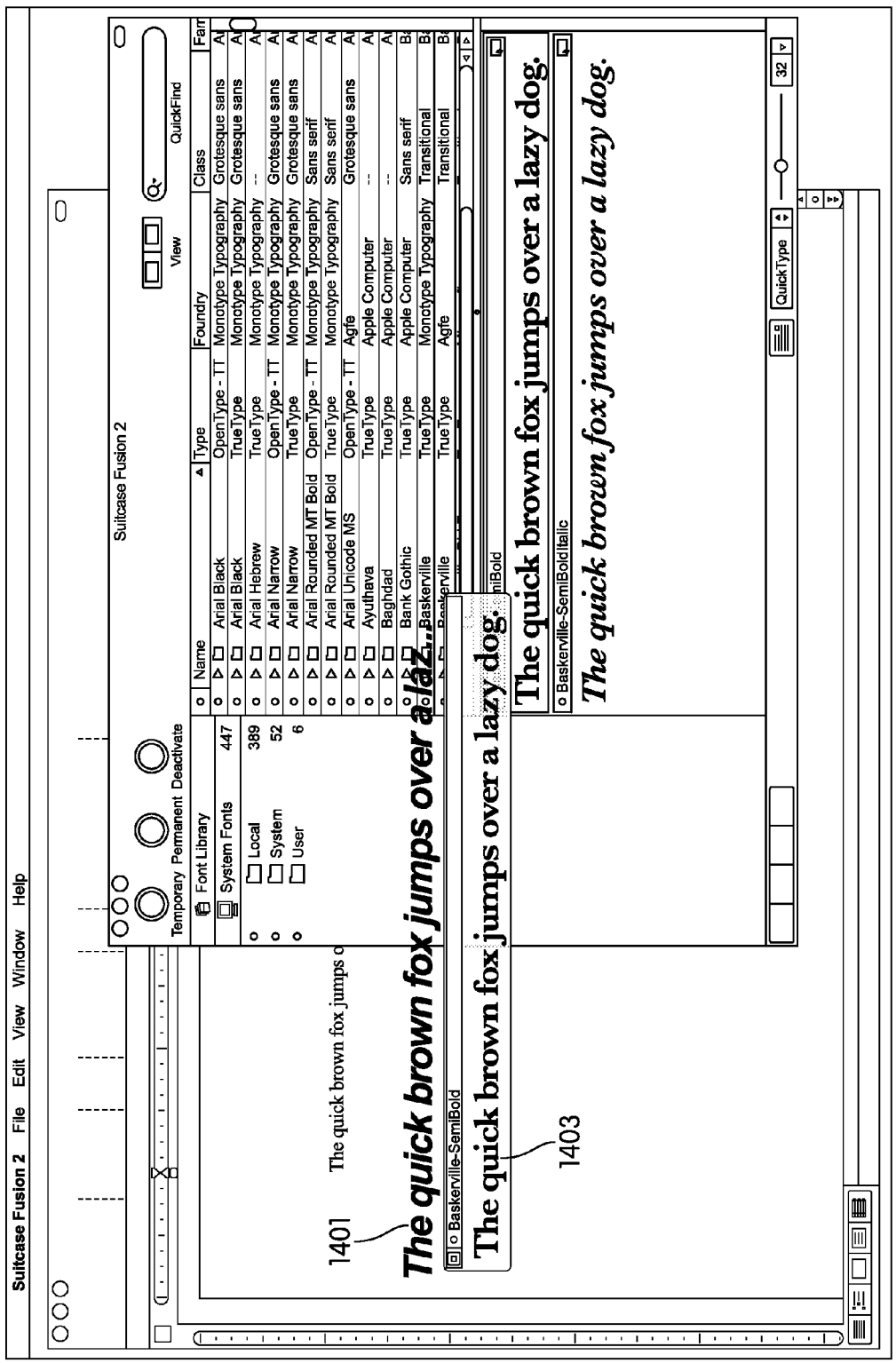

FIGS. 13 and 14 illustrate the use of multiple floating font preview panes to preview multiple fonts and/or font styles according to one or more aspects described herein.

Figure 15:
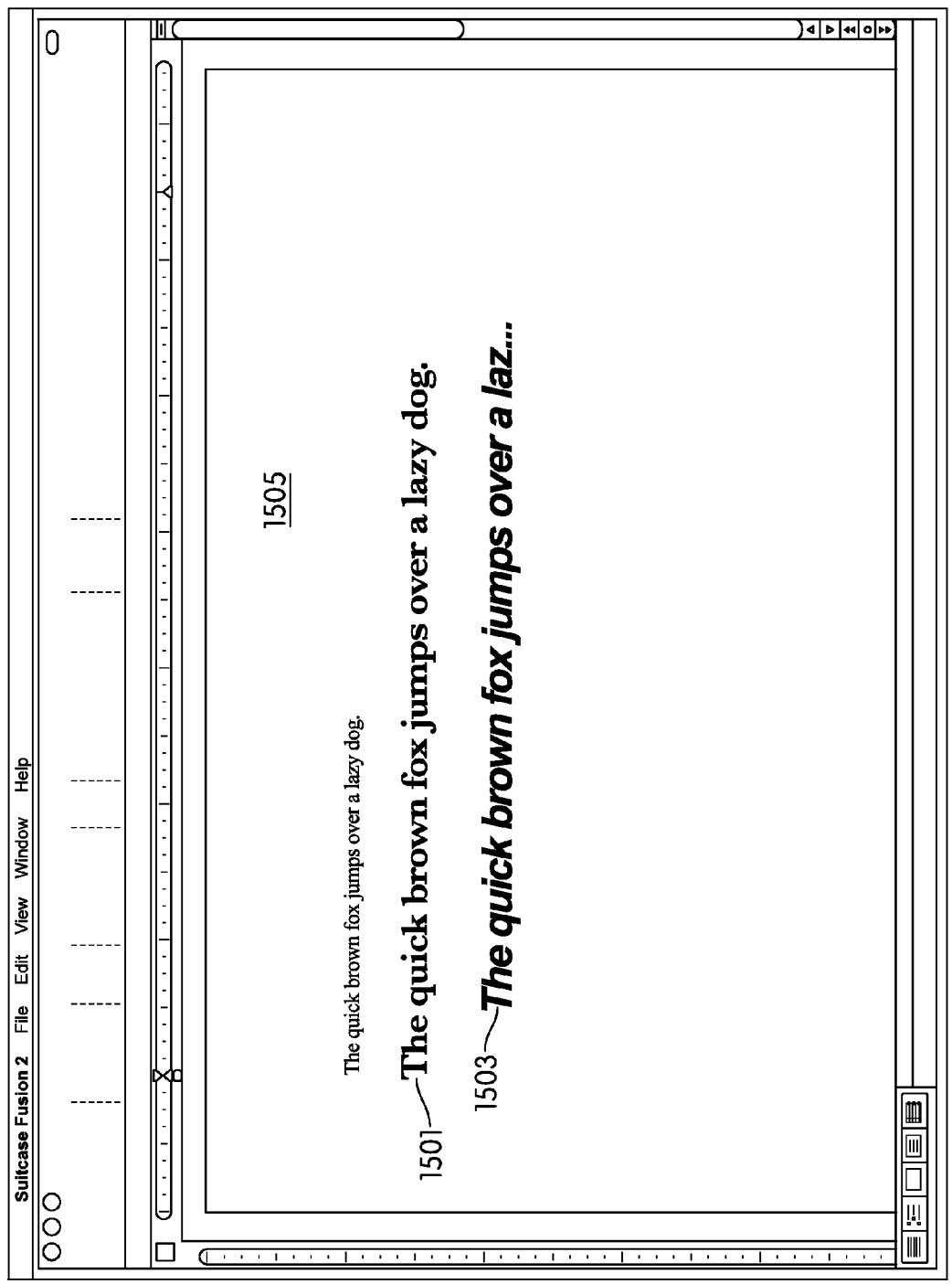

FIG. 15 illustrates multiple transparent floating font preview panes overlaying a word processing document according to one or more aspects described herein.

FIGS. 16-21 illustrate the merging, scrolling and unmerging of preview panes according to one or more aspects described herein.

IV. DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Some aspects of the present invention relate to a font management system for managing the availability and usage of a large number of fonts for specific applications. Embodiments of the invention below are described using a mouse. It should be understood that other user input devices may be employed including, but not limited to, keyboard, a track ball, touch screen, voice recognition circuitry, infrared control and the like.

Figure 1:
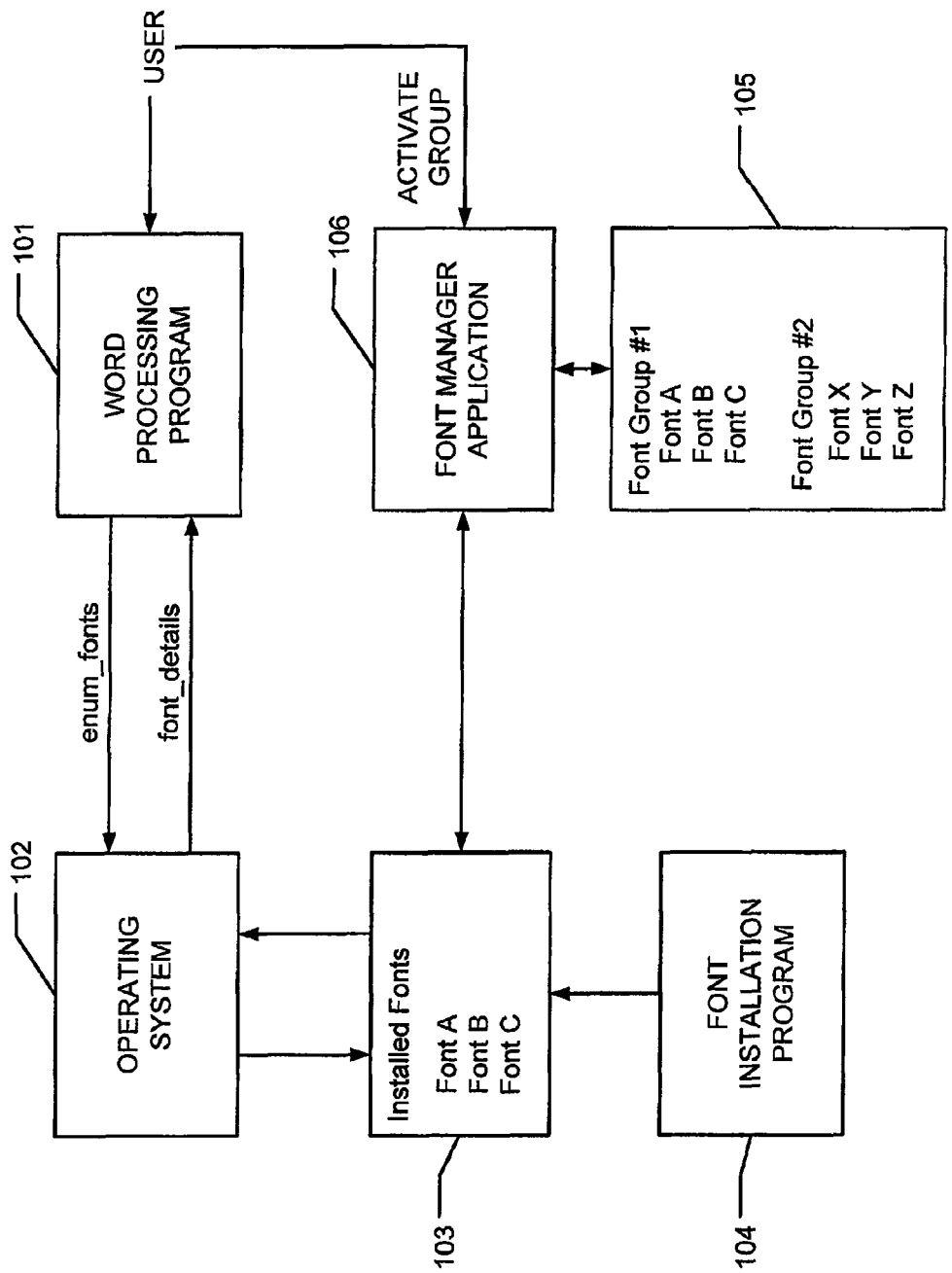
FIG. 1 shows a conventional system for managing a large numbers of fonts on a single computer.
Figure 2:
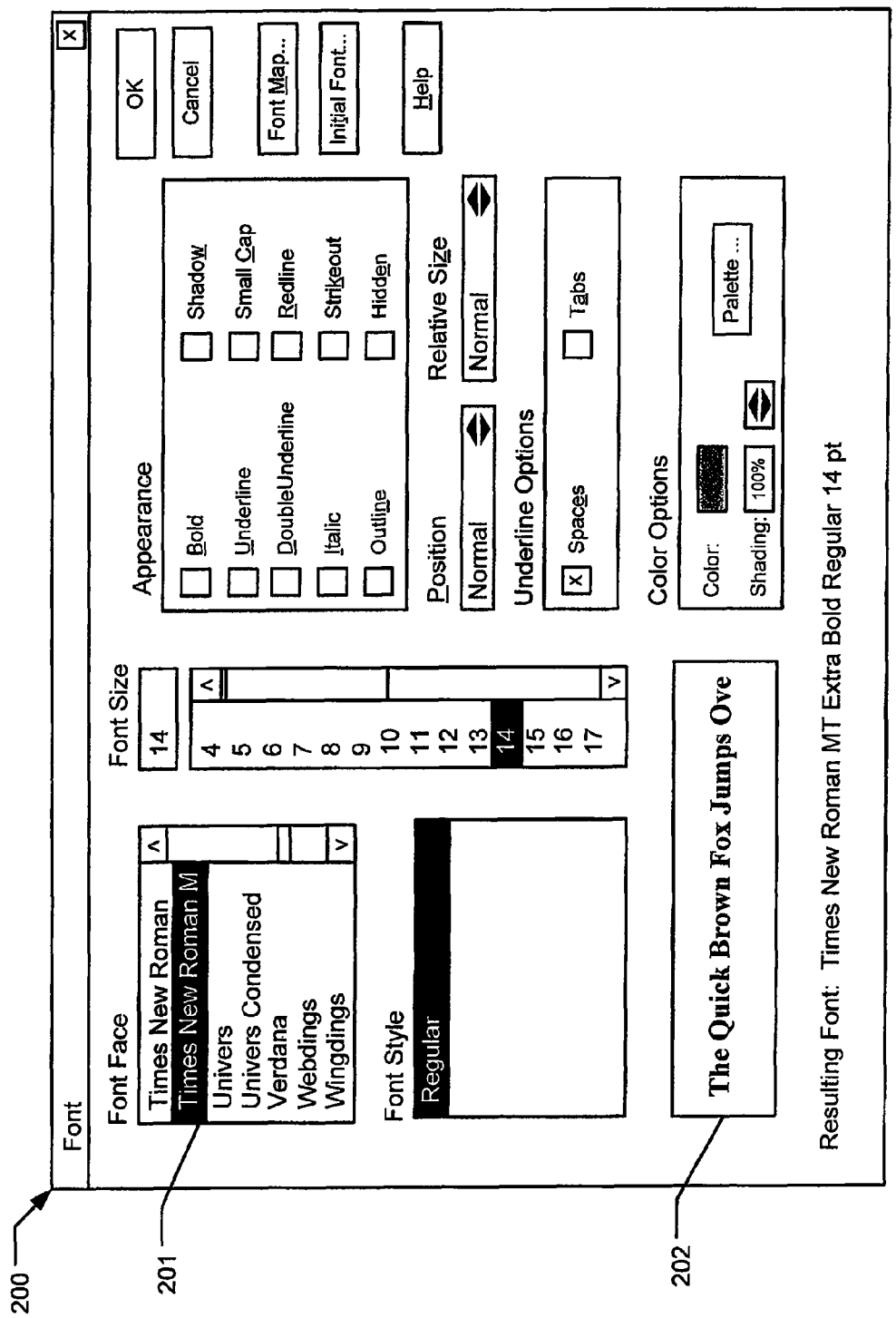
FIG. 2 shows a conventional font selection dialog box for a word processing application.

A method of previewing fonts according to the present invention may be implemented in the general structural environment of FIG. 1 by adding new functional responsibilities to the font manager application 106. As with conventional systems, a font manager application 106 may be employed which interfaces with a font grouping database 105, which stores one or more groups of user-defined, predefined or otherwise dynamically defined font groups. According to the invention, fonts may be grouped, for example, by family, classification, job or document they are used to create, customer, foundry, license, or application. Responsive to a user selection or activation of a particular font group, the font manager application 106 installs the activated or selected font group in the installed fonts database 103. Thus, the fonts in the activated font group become available for the application being run by the user for example, a word processing program 101. Illustrative word processing programs include, among others, Adobe InDesign, Adobe Illustrator, Quark Xpress, MS Word, Corel WordPerfect, and the like.

According to aspects of the present disclosure, fonts in a defined font group or any font available to the font manager application 106 may be previewed in a preview window displayed on a display screen. An illustrative user interface (UI) 300 for previewing fonts is shown in FIGS. 3A-3D. Three separate pane areas are shown in FIGS. 3A-3D: font group area 310, available font area 320 and font preview area 330.

In font group area 310, a subset of illustrative font groups are identified (e.g., Adobe Systems, Image Club Graphics, Microsoft) in the font group name section 312 and the number of fonts in the font group can be displayed adjacent to the font group name in the num fonts/type section 314. A scroll bar 316 is provided so that a user may scroll down the list of font groups to access additional fonts not present within the font preview area 330. When a user moves a cursor on the UI 300 to highlight or select one of the font groups, text can be previewed in the font preview area 330 for fonts found in the highlighted or selected font group. Selection and highlighting of the font groups may also be conducted in other ways including using a key on a keyboard or a combination or series of keys. Alternatively, the user may change the activation status of the font group by checking a selection box or some other selection method. In the illustrative embodiment shown in FIGS. 3A-3D, the Microsoft font group has been highlighted for preview in the font preview area 330.

A user may select an icon 315 in the font group area 310 and a menu of the fonts (not shown) in the font group can be listed immediately beneath the font name. In the specific example of font group area 310, a list or menu of fonts may be displayed by expanding a font tree of a font group using icon 315. In one or more configurations, icon 315 may change in appearance when the menu of fonts is displayed. Also, the foundry of each individual font may be displayed adjacent to the font name in the foundry area 318 of font group area 310. It should be understood that any number of information fields may be available for each font group or individual font in the font group name section 312. Scroll bar 319 allows a user to access additional information by moving the window of the font group area horizontally. From the menu of fonts in the selected group, the user may select a subset of fonts for previewing by, for example, clicking on various fonts in a font group. Further, a user may click on an individual font type and a submenu (not shown) for that font may appear including a list of various styles of the font. For example, for courier font, the submenu may include all available family members including courier, courier bold, and courier italic. Thus, a user may preview various forms of an individual font and/or compare one or more styles of one font with one or more styles of other fonts in the font preview area 330.

In the illustrative embodiments shown in FIGS. 3A-3D, the font manager is configured so that when a font group is selected, various styles of an individual font can be displayed. That is, in the font preview area 330 in FIGS. 3A-3D, various styles of the Georgia font are shown, Georgia (standard), Georgia (bold), Georgia (bold, italic) and Georgia (italic). Other forms may include underline, subscript, superscript, strikethrough and the like. It should be understood that this set up may be predefined in the font manager or dynamically altered according to the user's discretion.

In the available font area 320, a subset of the available font types is listed in the font type area 322 with the remainder being accessible by scrolling through the font type list using the scroll bar 324. Similar to the font group name section 312, information concerning the font type may be displayed in fields forming a row using scroll bar 326. A user may click on an available font and a menu listing of the various forms (not shown) of the font may be provided. The available font and font forms may be selected or highlighted in the same manner as the font groups, fonts in the groups or forms of the fonts in the groups, as described with respect to the font group area 310. Also, a font selected from the font group area 310 may be previewed with a font selected from the available font area 320.

The font preview area 330 provides a pane for viewing the selected fonts or font groups concurrently. Various preview formats can be provided by the font manager application 106 for viewing the fonts. In the illustrative embodiments of FIGS. 3A-3D, the font preview format is identified in the font preview type format box 332 and the font preview size format box 336. A default format may be provided upon entry into the font manager application 106, which may be predefined at the time of developing the font manager application and further modified by a user as desired. FIGS. 3A-3D show four illustrative font preview formats.

Figure 3A:
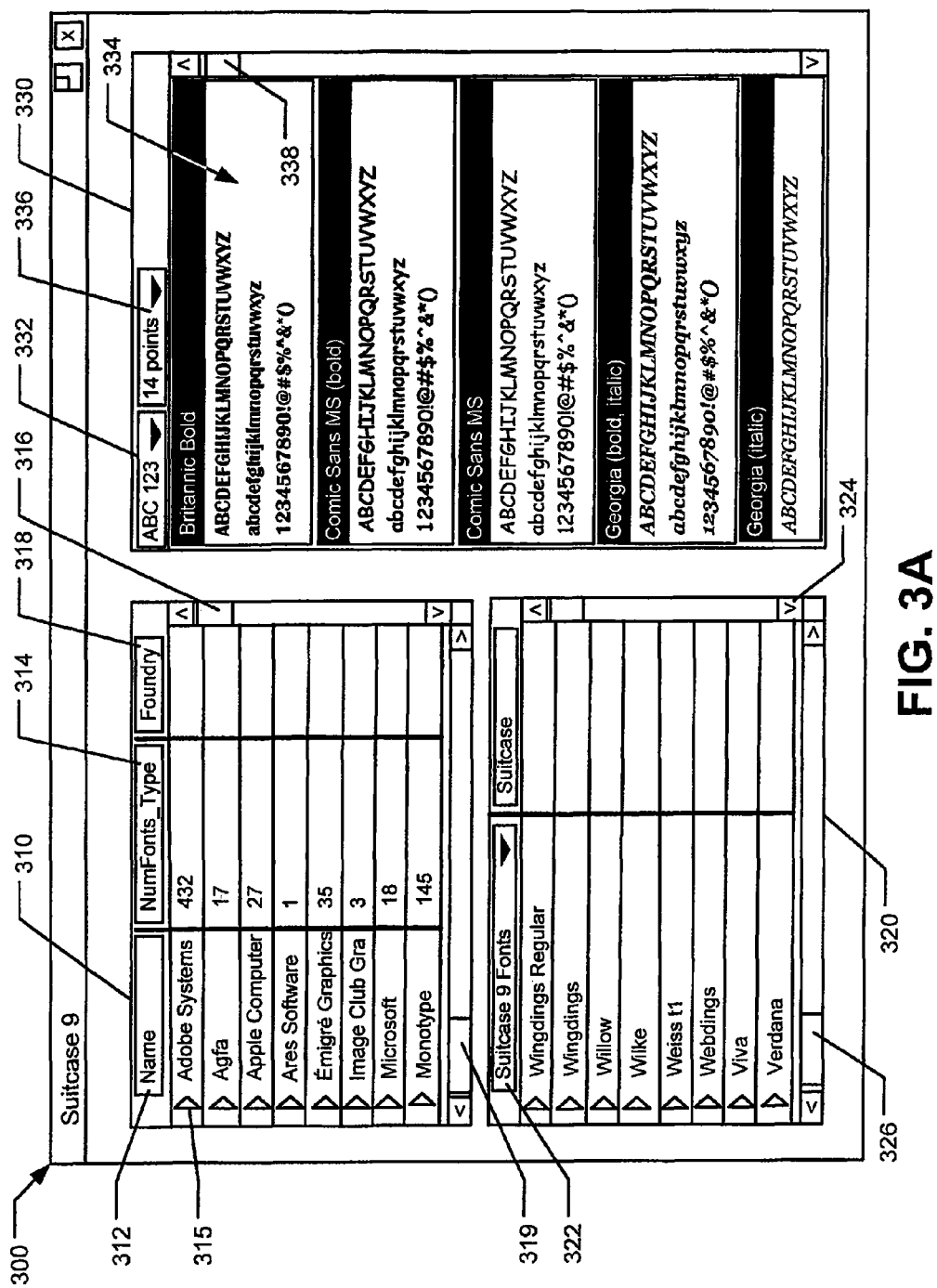

In FIG. 3A, for instance, the font preview type format defined in the font preview type format box 332 is "ABC 123," which indicates that the alphabet is shown in the selected font or fonts shown in the font preview display area 334 of the font preview area 330 in alphabetical order, in upper and lower case. The "ABC 123" preview type further provides the numbers 1-9 and 0 and corresponding symbols in substantially numerical order with 0 being located after 9, as illustrated. The corresponding symbols may include the symbols that are typically associated with the number keys on a QWERTY keyboard. For example, pressing the shift key in combination with the 1 key would cause a '!' to be inputted while shift in combination with 3 would cause a '#' to be inputted. The font size preview format box 336 may be used to control the size that is displayed. As shown, the displayed text is in 14 point size. A scroll bar 338 is provided, which can be used to view other fonts selected for preview, when the simultaneous display capacity of font preview display area 334 cannot include all of the selected fonts.

Figure 3B:
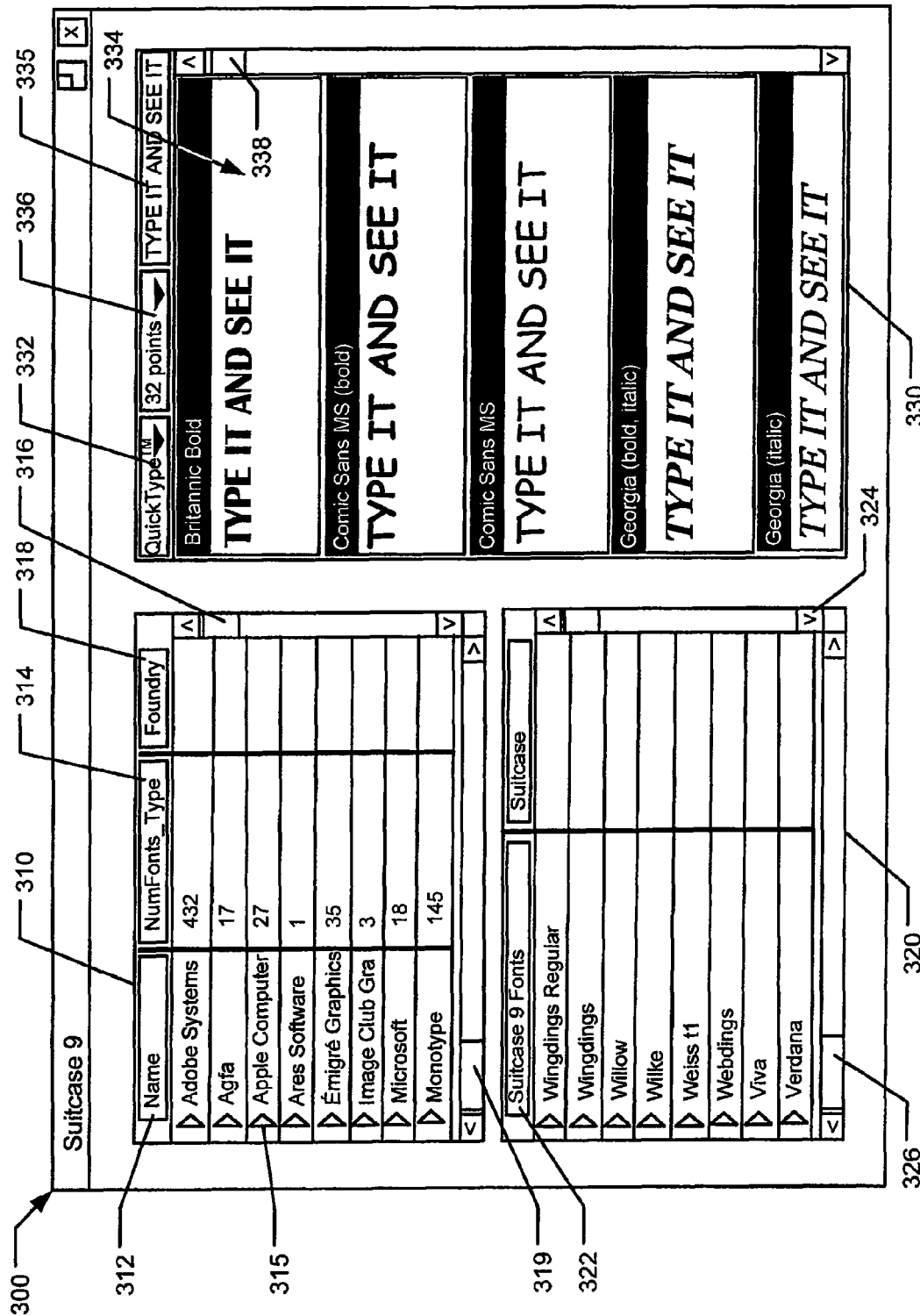

In FIG. 3B, the font preview format type defined in the font preview type format box 332 is "QuickType," which corresponds to text being displayed in the various selected fonts based on user entered text. That is, the text displayed in display area 334 corresponds to user-entered text in the text box 335 in the font preview area 330 (i.e., "TYPE IT AND SEE IT"). That is, the user may type in any desired text string for previewing in the font preview display area 334 and the text would appear in real-time in the font preview display area in the various selected fonts styles. The font preview size format box 336 allows a user to control the size of the text in the font preview areas. For example, in FIG. 3B, font preview size format box 336 indicates that the font is currently being displayed in 32 point size. In one or more configurations, a user, instead of selecting a font size from a drop down menu such as font preview size format box 336, may directly input a desired size such as 11.5, 10 or 45 or select the size by means of a slider bar that controls font size. In one or more configurations, changes made in the text box 335 may be reflected in the text shown in the floating preview panes as well as the text displayed in display area 334.

Figure 3C:
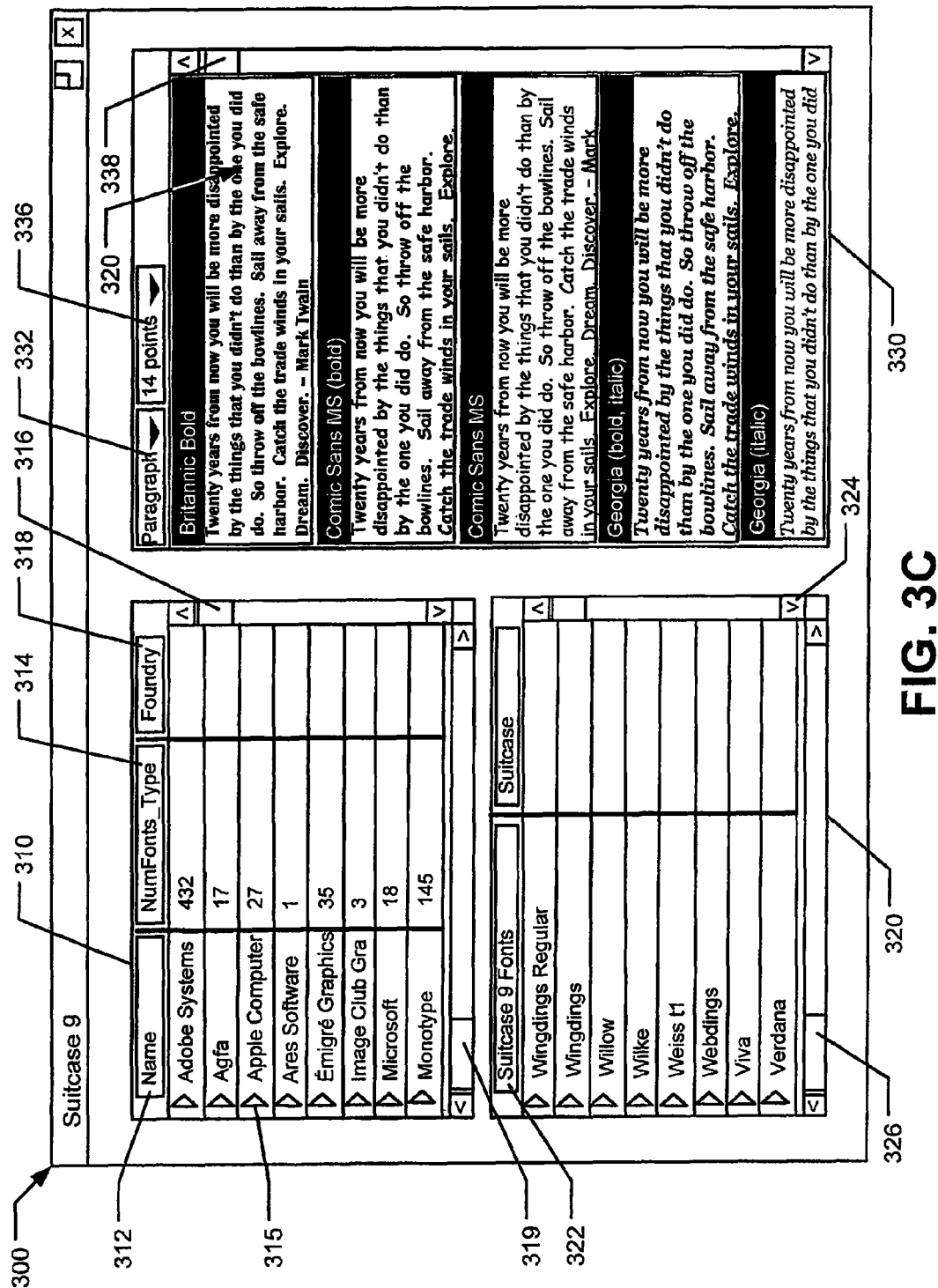

In FIG. 3C, on the other hand, the font preview type format box 332 indicates that the text is to be displayed according to a "Paragraph" preview format. The "Paragraph" preview format provides a paragraph of text, rather than single lines or words, in the selected font and size. The font preview size format box 336 indicates that the font is currently set at 14 point size. The displayed paragraph may be a default paragraph or may be defined by a user. For example, a user may modify settings to define what paragraph is to be shown in the Paragraph preview format. Alternatively, a user may be allowed to enter a paragraph into one or more of the font preview display area 334. Upon entry, the paragraph may be displayed in a corresponding font and selected size. Optionally, each of the other font preview display areas may also change to display the paragraph entered in font preview display area 334. In some instances, however, the paragraphs in one or more of the other font preview display areas may remain a different or default paragraph. According to another aspect, font preview display area 334 may further automatically adjust in size based on the size of the paragraph. For example, font preview display area 334 may increase in size so that a displayed paragraph is visibly displayed in its entirety. Font preview display area 334 may also provide a scrollbar if the paragraph to be displayed is too large, rather than or in addition to increasing the size of the display area 334.

Figure 3D:
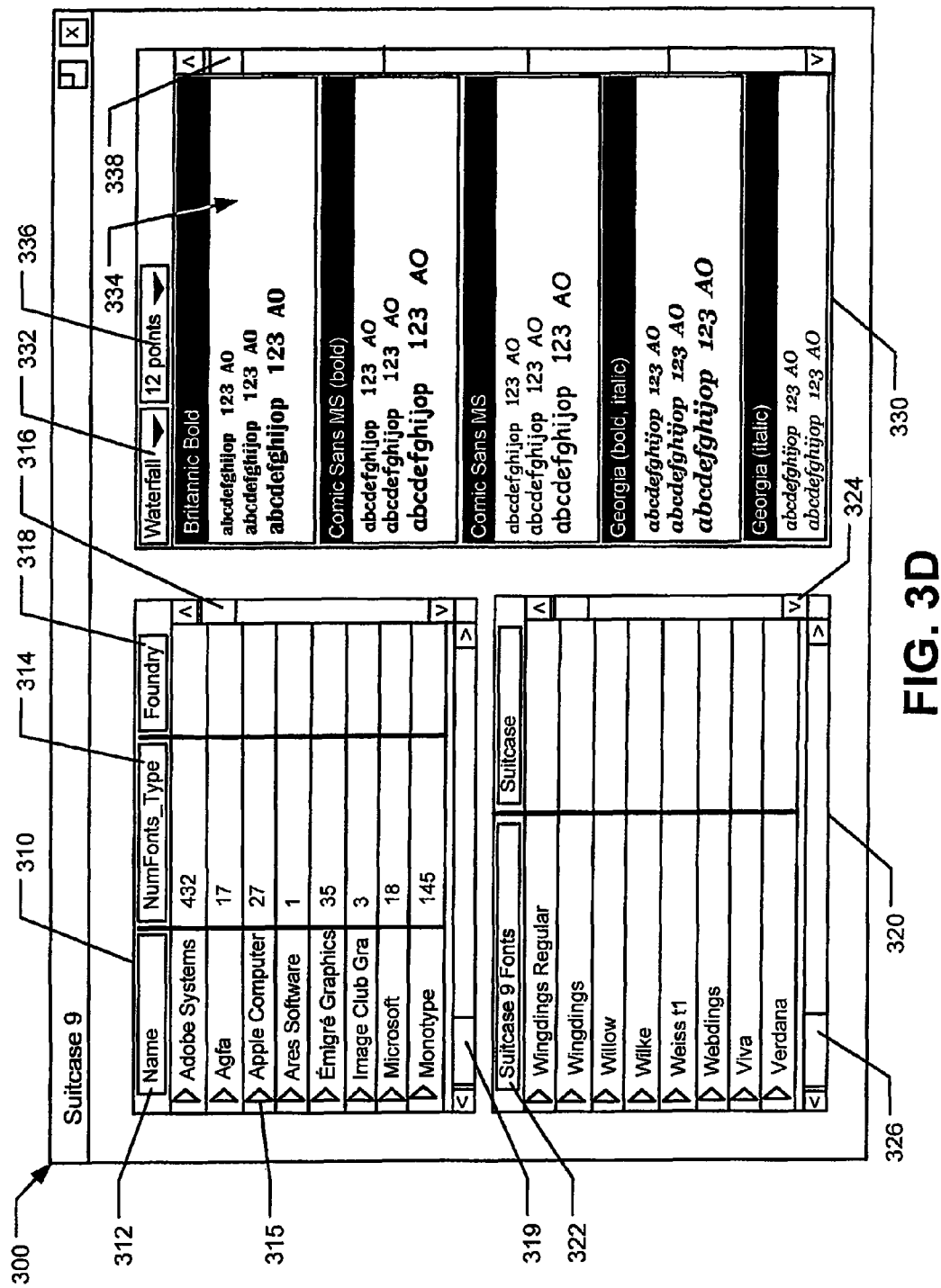

In FIG. 3D, a "Waterfall" preview format is selected in the font preview type format box 332. A "Waterfall" preview format refers to the display of text in a cascading fashion in the font preview display area 334. The displayed text may include letters, numbers, symbols and/or combinations thereof. The cascading aspect of the display format refers to the feature of displaying a set of letters, numbers and/or symbols in increasing or decreasing font size. Thus, the waterfall format allows a user to view text in different fonts as well as in several different font sizes for each of those fonts. In font preview size format box 336, a user may define the smallest, middle or largest font size to be displayed. The cascading text for each font may then display text in fonts corresponding to the specified font size. Thus, if the font size corresponds to a middle font size to be displayed, the text may be displayed in a smaller font size, followed by the selected font size, followed by a larger font size. For example, in FIG. 3D, the first line of text in a particular font can be displayed in a size smaller than 12 points (e.g., 10 points) and the third line of text can be displayed in a size larger than 10 points (e.g., 14 points). In another example, if the specified font size (i.e., 12 points) is the smallest font size to be displayed, the text may be displayed in 12 point font in a first line, followed by the text in 14 point font, followed by the text in 16 point font. In yet another example, if the specified font size is to be the largest displayed, text may be displayed in 8 point size, followed by 10 point size followed by the specified 12 point size. The size differential between lines of text may be 2 points, 3 points, 5 points, 10 points, 20 points or any other differential as predefined by the application or user.

A user may switch between font preview formats by clicking on the drop down list 332 of preview formats and selecting the desired preview format from a drop down menu listing each of the available preview formats. Similarly, the user may modify the font size by clicking on the font preview size format box 336, or, alternatively or additionally, by using a slider bar. Also, the user may print out the information displayed in the UIs of FIGS. 3A-3D by selecting the print function from a file menu (not shown) to print out a set of previewed fonts to create a typebook of previews.

While the user interface 300 for previewing fonts according to aspects described herein provides a user with the ability to compare multiple fonts, font sizes and font styles simultaneously, other benefits may be gained by allowing a user to view one or more fonts in context. That is, users such as creative professionals use font managers to identify a suitable font for a particular project like a web site, a document, a video, an image, a logo, an article, a letter, an application or the like. Thus, a font manager according to aspects of the present disclosure may allow a user to place and preview text in one or more selected fonts in such projects very quickly. This allows a user to preview different fonts without having to activate the font in a font manager or by dropping the desired font into the system font folder of the operating system, selecting that font (or group of fonts) from among potentially hundreds active on the operating system by name in a drop down menu in the desktop publishing application they are using, highlight the text they would like to preview in the selected font and then select and apply the font to the highlighted text. Using some current font selection and preview systems, users may further need to exit the desktop publishing application after the font is activated and relaunch it because the application does not respond to system font activation notification messages from the operating system and only updates the application's available font menu at launch. Clearly, the above constitutes a cumbersome series of steps for the end user just see if they want to use a particular type face in their project.

Instead, using aspects of the present disclosure, the user may avoid such cumbersome and time consuming steps by simply and easily dragging and dropping preview panes, as discussed below, onto a current project to preview one or more fonts in the actual context of the document in which the font would be used. Additionally, in one or more arrangements, the point size of the font can be easily adjusted using a slider bar, and the text may be easily adjusted by typing in whatever text, symbols, or code points from the font that the user would like to have displayed into the font manager preview quicktype box (e.g., box 335 of FIG. 3B). The background of the floating preview pane and the window that contains the font preview may further be transparent. The controls on and the window or border defining the floating preview might only become visible on mouse-over (e.g., for resizing the preview pane, or for grabbing and repositioning the floating preview pane). The rendered preview text, however, may always be visible so that the preview text appears as if it were part of the document or underlying content (i.e., instead of the preview pane). The floating preview panes may be the topmost windows on the desktop and as such will not be masked or tiled over if they are dragged over a desktop publishing application. In particular, if the underlying window is selected, the floating preview text will still be visible, allowing the user to continue editing the document while using the floating preview.

FIG. 4A illustrates a font manager application 420 of an embodiment utilizing one or more font preview panes 430. The font manager application 420 may be included in or overlay desktop 400 or application 410. In one or more configurations, the application 410 may be a word processing, spreadsheet, publishing, or any other application as introduced above. In an embodiment, as will be explained, one or more font preview panes 430 may facilitate a user's selection of a particular font or font style by allowing the user to visually compare two or more fonts substantially simultaneously. For example, from within the font manager application 420, a user may select one or more fonts from a font preview list 425. In particular, the user may select one or more individual fonts or groups of fonts with a dragging and dropping mouse action. More specifically, the user may drag and drop one or more individual fonts or groups of fonts from the font manager application 420 onto a location within the desktop 400 and/or application 410. Upon dropping the one or more fonts or groups of fonts onto the location in the desktop 400 and/or application 410, the font manager application 420 may spawn one or more font preview panes 430 that are substantially independent from the font manager application 400.

Each font preview pane 430 may provide a user with visualization of one or more fonts or groups of fonts and the ability to view the one or more fonts or groups of fonts with the context in which the fonts or groups of fonts may be used and to compare the one or more fonts or groups of fonts to each other and/or with one or more fonts contained in application 410. For example, each font preview pane 430 may display an individual font. The user may compare one or more fonts contained in the desktop 400 and/or application 410 to one or more fonts contained in one or more font preview panes 430. Further, the user may compare fonts contained in multiple font preview panes 430 to each other. More specifically, one or more font preview panes 430 may be partially or substantially transparent so that the background, for example a word processing or other text-containing document of application 410 and/or text contained in the desktop 400, may be at least partially visible through the font preview pane(s) 430. As illustrated by FIG. 4B, in an embodiment, once spawned, each font preview pane 430 may be dragged and relocated on the desktop 400 and/or application 410. Accordingly, combined with their partial or substantial transparency, one or more font preview panes 430 may be located adjacent to text, symbols, images, or the like within the desktop 400 and/or application 410 and/or adjacent to each other to provide the user with visual and substantially simultaneous comparison of one or more fonts and/or one or more groups of fonts.

As noted, each spawned font preview pane 430 may allow a user to better visualize a particular font. Each font preview pane 430 may also include different styles and/or sizes of the particular font the font preview window 430 represents. For example, in addition to a standard (e.g., 10 or 12 point) font sample, a font preview pane 430 may also include a bold font sample, an italicized font sample, an underlined font sample, or any other font style or combination of font styles. In an embodiment, the font preview pane 430 may further display additional font sizes. Whether for font style, font size, and/or a combination thereof, the font preview pane 430 may display one or more predetermined font styles, font sizes, and/or a combination thereof. Alternately or additionally, the font preview pane 430 may dynamically determine (e.g., using optical character recognition and/or metadata mining) one or more font styles, font sizes, and/or a combination thereof based on text that may be underlying or adjacent to the font manager application 420, the font preview pane 430, or otherwise mined from desktop 400 and/or application 410. For example, if a font preview pane 430 overlays a word processing document predominantly containing 12 point text, then the font preview pane 430 may display an alternate font in 12 point size in one or more different font sizes. Further, the font preview pane 430 may display the alternate font in additional sizes substantially adjacent to the 12 point size (e.g., 10 point and/or 14 point).

Once the font manager application 420 has spawned one or more font preview windows 410, e.g., in response to the user selecting one or more fonts or one or more groups of fonts, the user may interact with individual font preview panes 430. For example, the user may drag, drop, or otherwise locate one or more font preview panes 430 in the desktop 400 and/or application 410 to facilitate side-by-side comparison or the like with text, symbols, or other glyphs contained within a document, spreadsheet, publishing software or the like of application 410, or any other desktop item within desktop 400. In FIG. 4A, for instance, preview text in a first font and of different styles (e.g., bold, italics, etc.) and sizes (e.g., 10 point, 12 point, etc.) may be overlaid on document text (i.e., "Document Text") to show how text in the first font would appear in the context of the document and/or at a particular location in the document. Further, each font preview pane 430 may allow the user to manipulate or select one or more features to alter the appearance of the previewed font. For example, each font preview pane 430 may provide the user with controls to increase or decrease the point size of the font contained therein. Additionally, a font preview pane 430 may provide the user with controls to alter the color of the font text and/or to alter or edit the font text itself.

Once the user has previewed one or more alternate fonts and/or font styles, located the font preview pane(s) 430 within the desktop 400 and/or application 410, and altered one or more characteristics of the previewed font, the user may select a particular font from a font preview pane 430 for insertion into the document or for replacing a current font, style and/or size of existing text.

Moreover, preview panes may be added to or discarded from the set of floating previews on the desktop. These previews can be merged into circular list contained in a single preview pane that can be positioned in the exact location where the text may go in the document and the user can quickly compare this circular list of type faces in the context of the document by pressing the left or right arrow keys. The merged preview can be exploded into individual font preview panes, new panes can be added, old ones can be removed, and the list of floating previews can again be merged to allow the user to compare exactly how the type faces would appear in the document the user is creating, allowing the user to rapidly choose the exact type face they would like to use. As discussed, at the end of this process the user may then drop the font directly into the application by a drop operation. The drop operation may globally activate the font and cause the styled text to be inserted into the document at the location of the drop, thereby allowing the user to bypass the many steps that are typically required in current preview font systems. Accordingly, a user may work with and select a font based on the shape of the glyphs rather than by the name of the font— which in most cases bears no relationship to what the font looks like and is simply a product name attached to the set of glyphs.

Referring to FIG. 5, font preview pane 530 includes text "insert preview text" in multiple sizes of font style 1. Font preview pane 530 further includes an insert option 520 that allows a user to insert or drop the preview text into a document or to apply a font style to existing text in the document. According to one arrangement, a user may select font style 510 and subsequently use the insert option 520 to drop the preview text in the selected font style 510. A selection may be highlighted or otherwise indicated in preview pane 530. Additionally or alternatively, insert option 520 may include an expandable menu 515 that provides the user with the option to select a particular size and/or style (e.g., bold, italicized, underlined) of the font to be inserted. In one or more configurations, the document in which the preview text is inserted may be defined based on a document, file or area (e.g., document 525) on which preview pane 530 is currently overlaid. Alternatively, font preview pane 530 may be manually associated with a document or area by a user regardless of the position of preview pane 530. In yet another embodiment, a menu or option list (not shown) may be provided to the user listing the various documents, windows or areas in which the preview may be inserted or the font style applied. Further, preview text may be added to or may replace existing text, symbols, images or the like depending on whether existing text, symbols, images or the like is currently highlighted or otherwise selected.

According to some aspects, a user might not wish to insert the actual font styled text into a document or file. For instance, a user might not wish to insert a font that is proprietary to some entity and thus, requires licensing fees to distribute. In order to use such fonts, documents published to others would require that the user have a license to distribute the font used in the published document. Instead, a user may choose to insert a bitmap (e.g., an image) of the font styled text into the document. By inserting a bitmap, a viewing user does not need to have the font installed on his or her device; rather, the viewing user would simply need to be able to view bitmaps.

FIGS. 6A and 6B illustrate a font preview pane 635 that provides the option of inserting the previewed text as a bitmap or as text in an insertion menu 605 and the appearance of a bitmap after insertion. In FIG. 6A, once a user has selected a font, font size and style by highlighting the corresponding text 630, the user may then select the insert option 601, causing insertion type menu 605 to appear. Insertion type menu 605 provides the user with the option to insert a font styled text using text insertion mode 615 or a bitmap insertion mode 620. Upon selection of one of the text insertion mode 615 and the bitmap insertion mode 620, the selected preview font style may be applied to or inserted into document 625 in accordance with the selected mode. Specifically, if the bitmap insertion mode 620 is selected, a bitmap 640 of the selected preview font styled text may be generated and placed in document 625, as illustrated in FIG. 6B. The insertion point may be defined by the location of a cursor in the document 625, a highlighted portion, a default location (e.g., end or beginning of the document) or the like. The dotted line 645 indicates a boundary of the bitmap 640 that may or may not be visible. As shown, the insertion of bitmap 640 may cause the shift of a remainder of document 625.

FIG. 7 illustrates a method by which text may be previewed and subsequently inserted into a file or document. In step 700, for instance, a font preview system may receive one or more font selections to preview. In response, the system may generate font previews for each of the selected fonts in step 705. For example, previews of each selected font or font group may be displayed in preview panes 430 of font manager application 420 of FIG. 4. In step 710, the font preview system may receive an instruction to generate a separate preview pane so that a user may preview the font in a particular context such as a document, image or other media. For example, the instruction may correspond to a user clicking and dragging a floating preview pane out of a font manager interface. In response, the font preview system may generate the separate preview pane in step 715. The preview pane, as discussed herein, may include a level of transparency that permits a user to view underlying text or images on which the preview pane is overlaid. This allows a user to view a preview font in context with the contents of an intended destination document or other file. The level of transparency may be set by the preview system upon creation.

If the user is satisfied with the appearance of the preview font in the intended context, the preview system may subsequently receive a command to insert or apply the preview font in a destination document in step 720. In step 725, the preview system may determine whether the command corresponds to a bitmap insertion mode or a text insertion mode. If the command corresponds to a bitmap mode, the preview system may generate and insert a bitmap of the preview font into a destination document in step 730. If, however, the command corresponds to a text insertion mode, the preview font may be activated for use by document processing application in step 735. The preview font may be globally activated for all processes running on the operating system or may be locally activated for one or more specific processes. Once activated, the preview font may be inserted into the document as text in step 740. In one example, the text may be copied from the font preview system to a clipboard and subsequently from the clipboard to the document. Using the above methods, font styled text may be previewed and inserted from a font manager application without requiring use of both a font manager and a document editing application to insert the font styled text. In some instances, the text insertion mode may require the activation of a corresponding font style for proper rendering and use.

As noted with respect to FIG. 4, a font preview pane 430 of an embodiment may include a transparent background so that underlying text, symbols, or the like under the font preview pane 430 (e.g., from desktop 400 and/or application 410) remain substantially visible. The font preview panes 430 are also, in an embodiment, always on top. That is, they are superimposed over a desktop 400 and/or application 410 containing text, symbols, images or the like or any other desktop 400 area or item and remain active windows. Further, the font preview panes 430 remain active as they are dragged, dropped, or otherwise relocated within the desktop 400 and/or application 410 area. The font preview panes 430 of an embodiment may be manually resized or may automatically resize depending on the quantity, size, style and/or other characteristic of the text and/or symbols they contain. A font preview pane 430 may further alter its appearance upon mouseover or other selection action to indicate to the user with which font preview pane 430 they may interact. For example, upon mouseover or other selection action, the transparent background of a particular font preview window may darken, change shade, or decrease transparency to indicate the user with which font preview pane 430 they may interact.

In some embodiments, an auto-activation feature may also be included. In particular, fonts may be automatically activated upon the occurrence of some trigger. For example, when opening a document including a specific font, the font may be activated for the corresponding document editing application or globally.

In one embodiment, creative professionals are given total control, absolute precision and maximum flexibility at all times, the previewing system creates an entirely new font management environment through a flexible user interface and code base. The font management and preview system provides a progressive application that provides precise font activation, outstanding font previews, and advanced corruption checking and repair. Users can easily preview and navigate through potentially thousands of glyphs within a single type face, compare and ultimately select the most ideal font for the project. The floating preview feature allows creative professionals and other users to literally drag-and-drop type previews directly onto a layout for easy comparison and selection. The font and preview manager also allows users to view multiple fonts side-by-side and dynamically zoom the point size up-and-down on the fly. In addition, users are able to print font previews to further compare font choices.

Additionally, the font and preview management system may also include auto-activation plug-ins that automatically turns fonts on and off within the applications users leverage every day. For example, Plug-ins and XTensions may include support for Adobe® InDesign® CS4, Adobe Illustrator® CS4 and QuarkXPress 8, as well as for Creative Suite 3 software applications and QuarkXPress 7. Auto-activation operates in the background and provides users with the ability to seamlessly work in their chosen applications while automatically activating the exact fonts by utilizing a font matching capabilities feature. A font sense feature creates a unique ID for each font—like font fingerprinting—to ensure font consistency as documents move from design through production.

FIG. 8 illustrates an example font manager user interface prior to font population. Interface 800 includes a font group listing pane 801 that provides groupings of fonts such as Font Library 803 and System Fonts 805. Fonts listed in Font Library 803 may represent those fonts that have not yet been loaded into the system while fonts listed in System Fonts 805 may represent those fonts that have been loaded. Being loaded into the system may generally refer to being available and useable by applications running in the system. The number of fonts included in a particular group 803 and 805 may be displayed to the right of the group name. Thus, in the illustrated example, a user is able to identify that there are 385 fonts in font group 805.

FIG. 9 illustrates interface 800 upon selecting one of groups 803 and 805, e.g., System Fonts 805. Upon selection of group 805, font pane 807 may be populated with fonts 808 included in the selected group 805. Additionally, in response to the selection of group 805, sub-groups 809 may be displayed to provide a further level of detail and categorization. For example, sub-groups 809 may include Local fonts 809a, System fonts 809b and User fonts 809c. Status indicators 811 may be used to specify the status of each font, sub-group of font or group of font. For example, each of sub-groups 809 may be identified as permanent fonts. Permanent fonts may include fonts that are always activated in the system regardless of the applications currently loaded or running. Temporary fonts may include fonts that are active in the system but that may be deactivated depending on the applications currently running on the system. Deactivated fonts are those that are not currently loaded in the system.

FIG. 10 illustrates font manager user interface 800 with preview text in a font display area 813. Upon selecting one of fonts 808, display area 813 may be populated with text in the selected font 808 in multiple different styles (e.g., italicized, bold, bold+italicized, underlined, etc.). The styles may be identified by a header bar 815 for easier identification and selection by a user. In one or more arrangements, font size selector 817 may include a slider bar that allows a user to adjust the size of the font displayed in display area 813. The corresponding size value may be indicated in drop down menu 819 that may also be used to modify the font size.

As described herein, font previews may be used to preview a font against a particular context. FIGS. 11-14 illustrate use and movement of floating preview panes in various areas of a screen. FIG. 11, for example, illustrates a preview pane 1100 corresponding to text displayed in display area 813. Preview pane 1100 may be created by selecting a portion of display area 813 corresponding to desired preview text and dragging the portion of display area 813 out of display area 813 and interface 800. Preview pane 1100 may then be moved to a desired location such as overlaying a word processing document 1105.

FIG. 12 illustrates preview pane 1100 in a transparent mode where a window or outline of pane 1100 is invisible and a background of pane 1100 is transparent. Thus, the only portion of preview pane 1100 that is visible is the preview text 1110. This allows the user to view preview text 1110 in a particular context without the distractions of window borders, title bars, backgrounds and the like.

FIG. 13 illustrates a second preview pane 1300 that is also generated from display area 813. For example, preview pane 1300 may correspond to italicized Arial while preview pane 1100 may correspond to bolded italicized Arial.

FIG. 14 illustrates another example interface where multiple floating preview panes 1401 and 1403 are displayed simultaneously.

In one or more arrangements, rather than displaying multiple different floating preview panes simultaneously (e.g., as shown in FIGS. 13 and 14), the preview panes may be merged into a single scrollable preview pane. FIGS. 15-21 illustrate such merging of preview panes, switching between fonts in the merged preview pane and unmerging of the preview panes. FIG. 15, for example, illustrates transparent preview panes 1501 and 1503 overlaying a word processing document 1505. In some instances, the user may wish to compare multiple fonts in the word processing context in the same location. Rather than having to move a preview pane 1501 from a desired position to make room for preview pane 1503, the user may merge preview panes 1501 and 1503.

Figure 16:
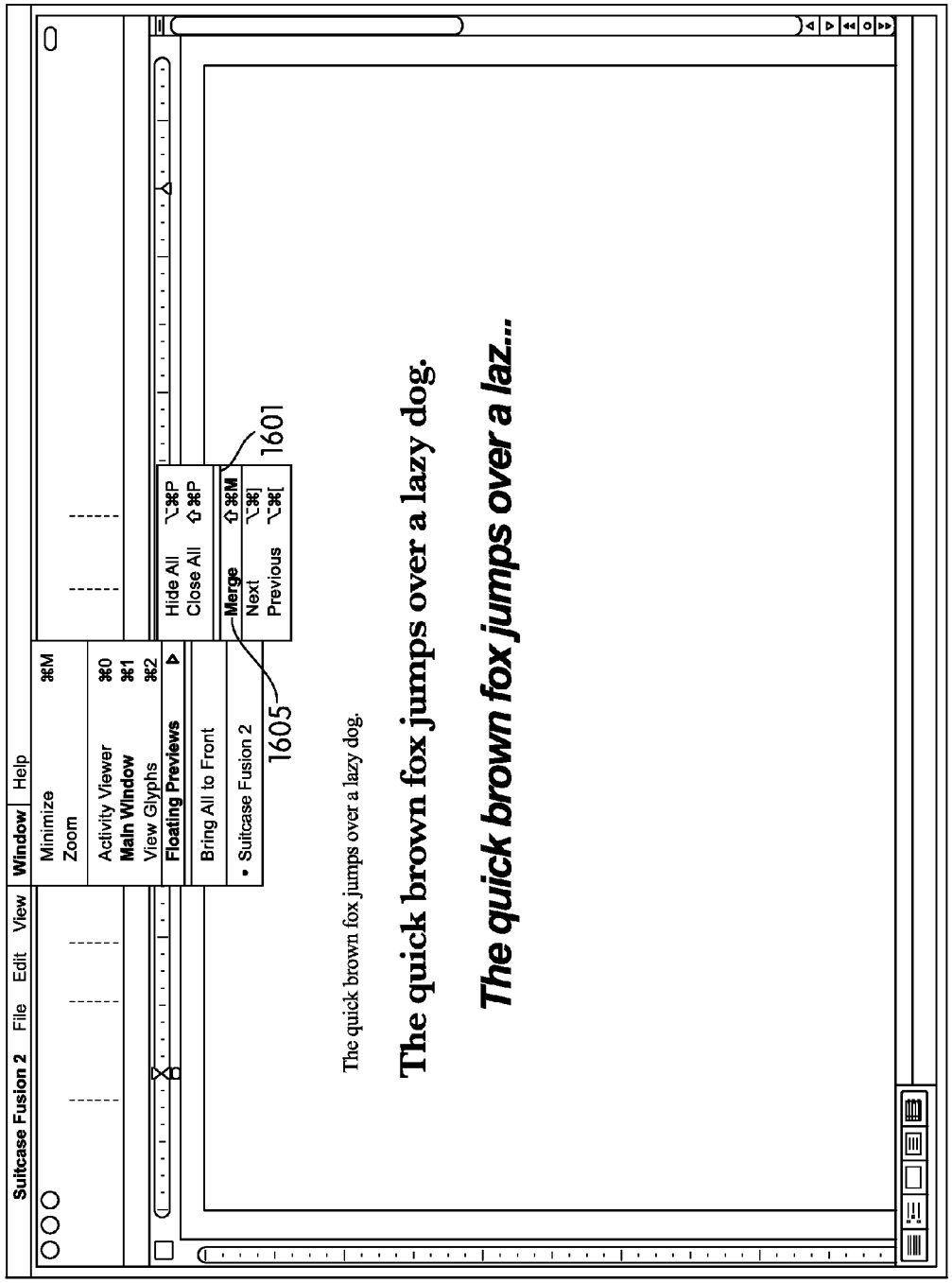

FIG. 16 illustrates an example interface in which a user may select a merge option 1605 from a preview pane options menu 1601.

Figure 17:
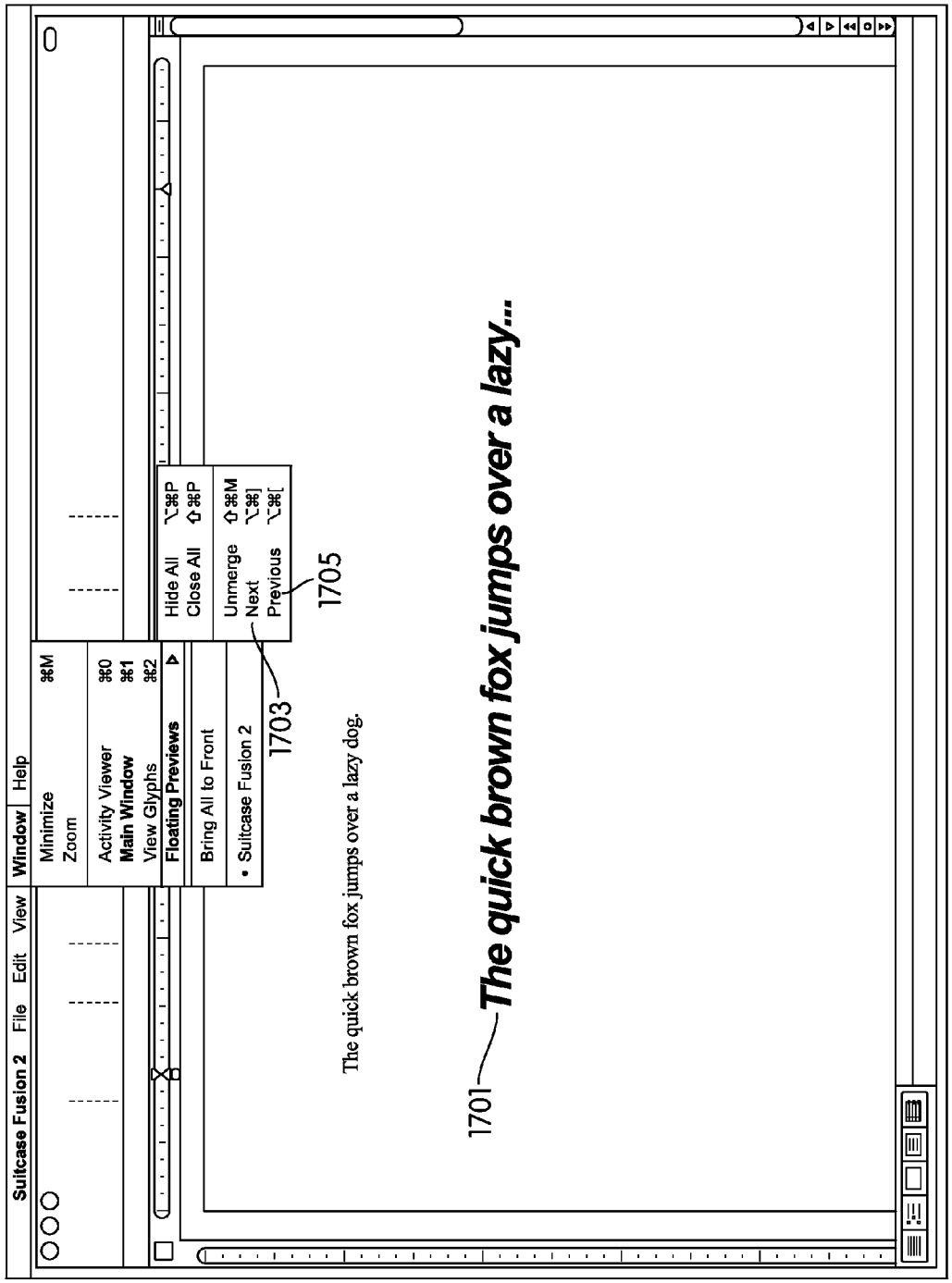

FIG. 17 illustrates an example interface in which preview panes 1501 and 1503 have been merged into single preview pane 1701. Preview pane 1701 might only display text for a single font and font style at a given time. To access or view another merged font and font style, a user may scroll the preview pane 1701 using next option 1703 or previous option 1705.

Figure 18:
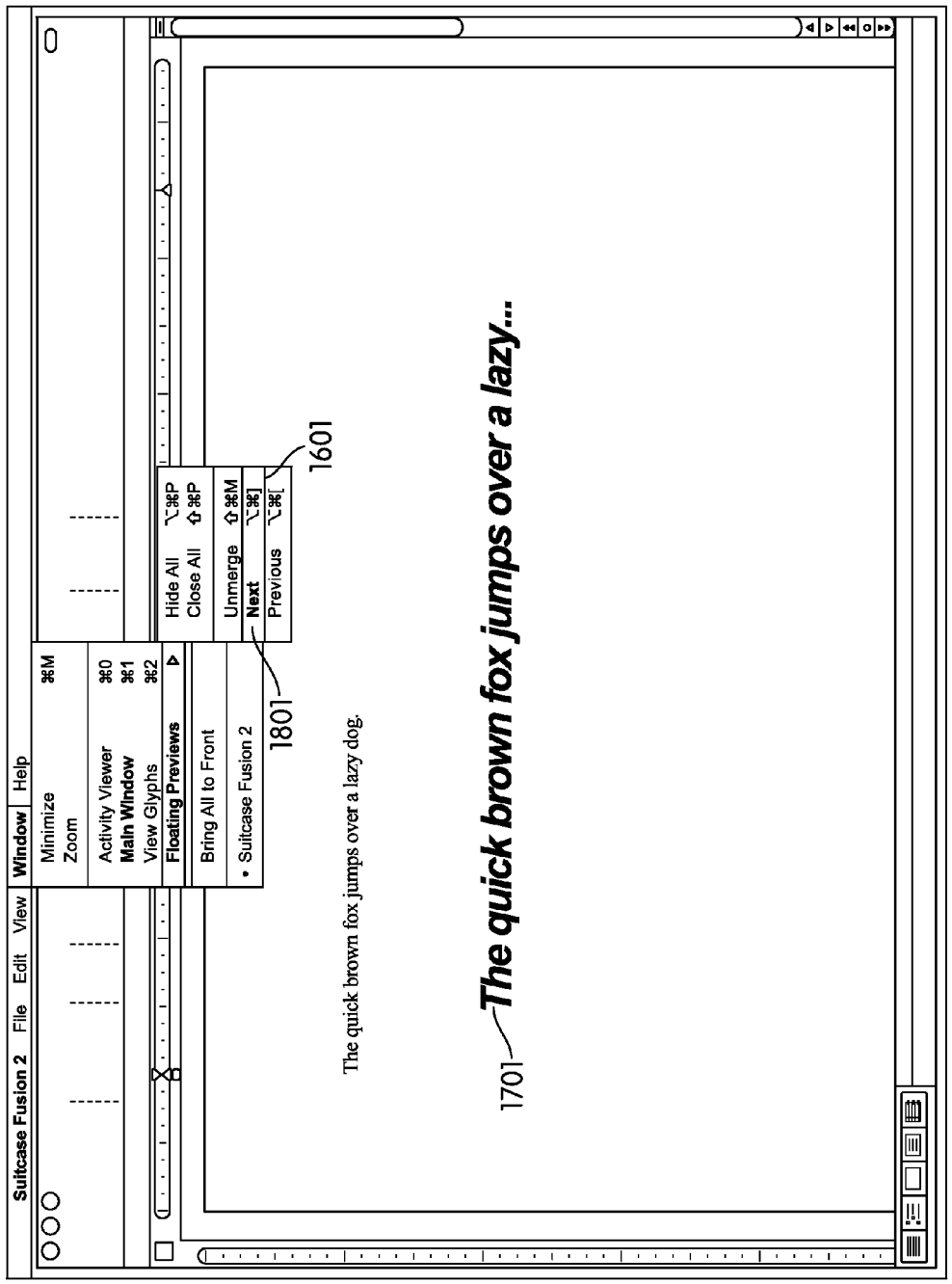

FIG. 18 illustrates a user selection of a next option 1801 from menu 1601 to scroll or advance to another font and font style in the merged preview pane 1701.

Figure 19:
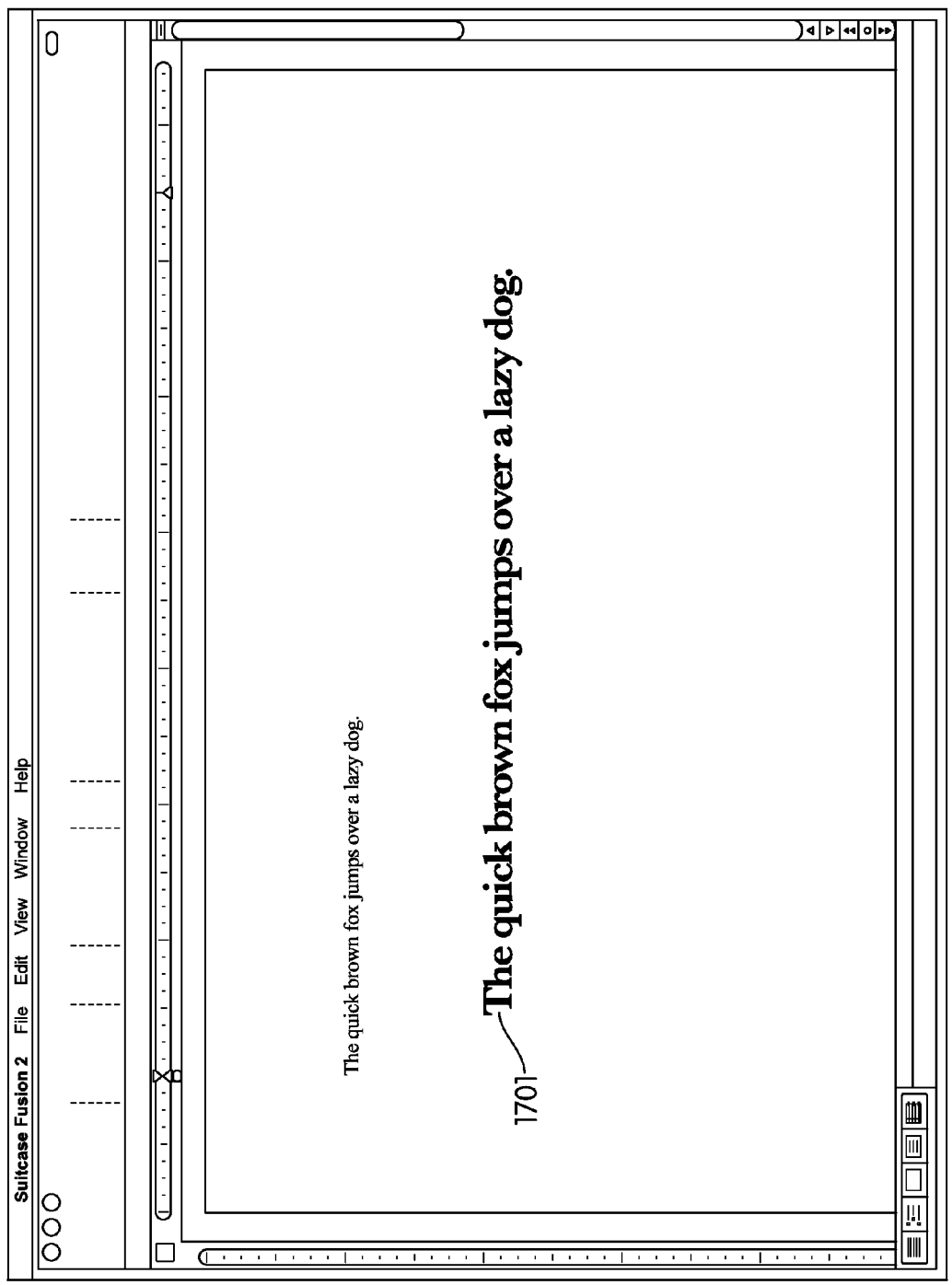

FIG. 19 illustrates an example interface upon a user scrolling to another font and font style in the merged preview pane 1701. Thus, instead of displaying bolded and italicized Arial text, preview pane 1701 now displays italicized unbolded Arial text. Although the illustrated examples only show the merging of two preview panes and fonts/font styles, more than two preview panes may be merged and scrolled in similar fashion.

Figure 20:
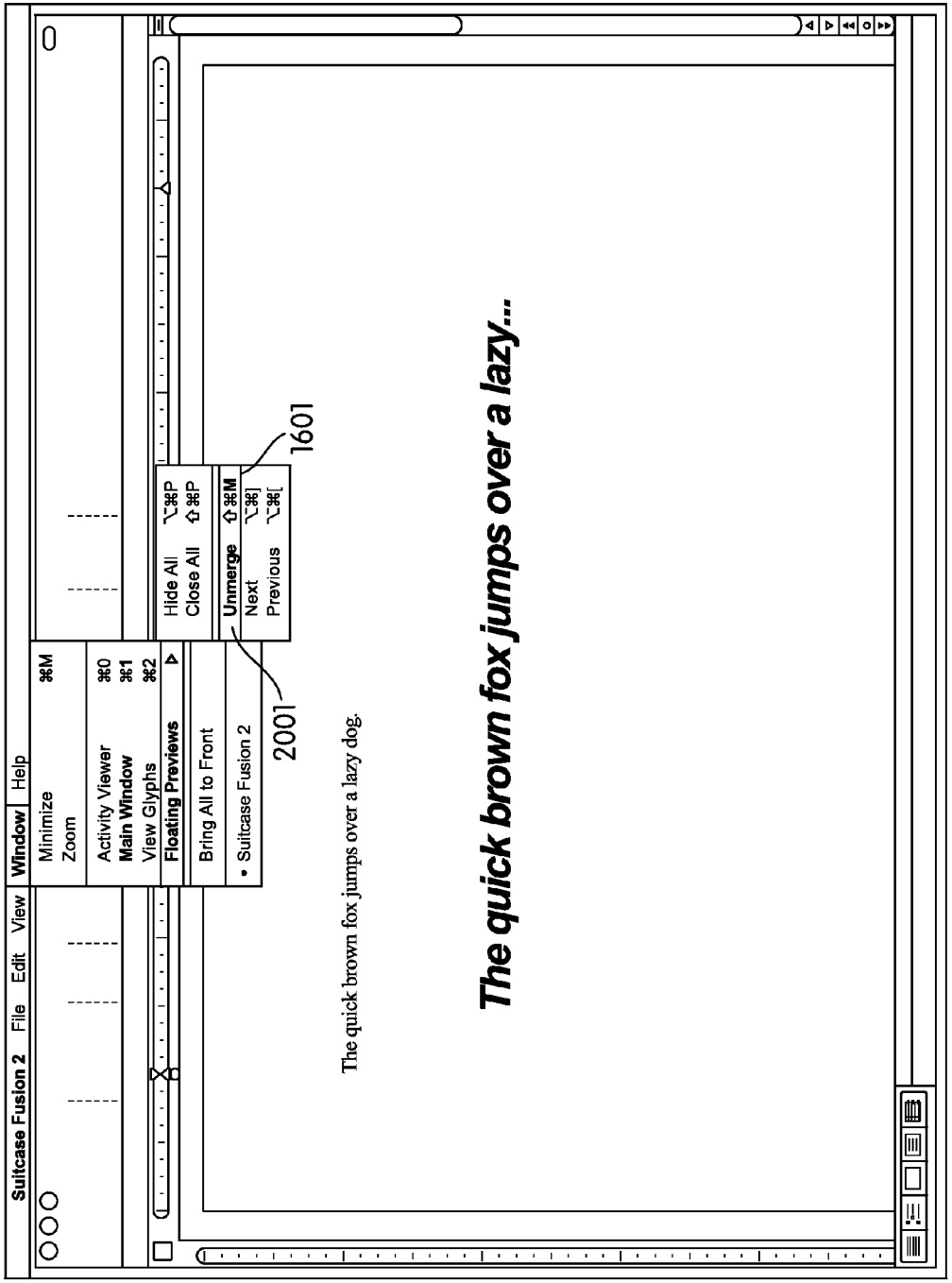
Figure 21:
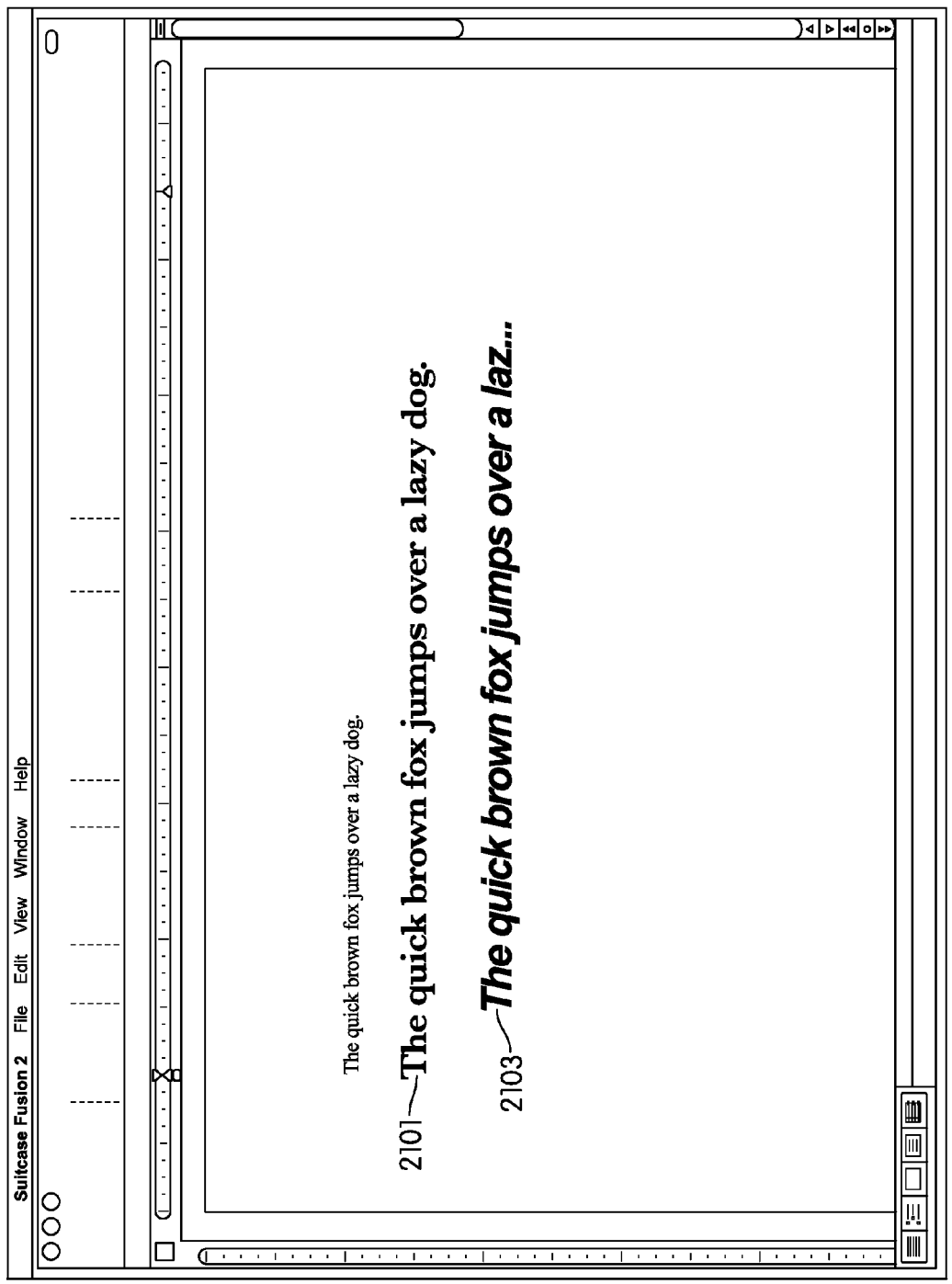

FIG. 20 illustrates an example interface in which a user selects an unmerge option 2001 from menu 1601. As a result, the preview panes and corresponding fonts/font styles may be unmerged and displayed as separate preview panes 2101 and 2103 in FIG. 21.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. One or more computer readable media storing computer readable instructions that, when executed, cause an apparatus to:
  receive a request identifying a content data file;
  generate a user interface comprising:
    a font preview display area including a font manager interface associated with a plurality of removable font preview panes, each of the plurality of removable font preview panes displaying preview text in a different preview font, and
    a content display area including text in a at least one font, wherein the text and the at least one font are defined by the content data file, and wherein one of the plurality of removable font preview panes overlays the text such that the preview text and the text are both visible;

while the plurality of removable font preview panes is displayed, receive a request to merge at least two panes from the plurality of removable font preview panes; and combine the at least two panes into a scrollable font preview pane, wherein the scrollable font preview pane is scrollable between each of the preview text from the at least two panes.

2. The one or more computer readable media of claim 1, wherein the one of the plurality of removable font preview panes is separate from the font manager interface.

3. The one or more computer readable media of claim 2, wherein the one of the plurality of removable font preview panes is transparent to allow the text to be visible.

4. The one or more computer readable media of claim 1, wherein the one of the plurality of removable font preview panes includes an insertion option for inserting the preview text into the content display area.

5. The one or more computer readable media of claim 4, wherein the insertion option is configured to insert the preview text into the content display area as a bitmap.

6. The one or more computer readable media of claim 1, wherein the content display area corresponds to an electronic document.

7. The one or more computer readable media of claim 1, wherein the one of the plurality of removable font preview panes overlaying the text is transparent.

8. A method comprising:

receiving a request to separate a first font preview pane from a font manager interface, wherein the first font preview pane includes first preview text in a first preview font;

in response to the request, separating the first font preview pane from the font manager interface; setting a transparency of the first font preview pane such that the first preview text is visible and text on which the first font preview pane overlays is visible via the transparency;

displaying a second font preview pane from the font manager interface, the second font preview pane including second preview text in a second preview font;

while the first font preview pane and the second font preview pane are both displayed, receiving a request to merge the first and second font preview panes; and combining the first and second font preview panes into a third font preview pane, wherein the third font preview pane is scrollable between the first preview text in the first preview font and the second preview text in the second preview font.

9. The method of claim 8, further comprising:

receiving a command to insert the first preview text into a document associated with the text; and in response to the command, inserting the first preview text into the document.

10. The method of claim 9, wherein the first preview text is inserted as a bitmap.

11. The method of claim 8, further comprising:

receiving user input corresponding to a request to scroll the third font preview pane; and in response to the request, displaying the second preview text in the second preview font in place of the first preview text in the first preview font.

12. The method of claim 8, further comprising:

receiving a command to modify the text in accordance with the first preview font; and in response to the command, modifying the text to the first preview font.

13. The method of claim 8, wherein the first font preview pane includes the first preview text in the first preview font in a plurality of different font sizes.

14. The method of claim 8, wherein the first preview text is user specified.

15. An apparatus comprising:

a processor; and memory operatively coupled to the processor and storing computer readable instructions that, when executed, cause the apparatus to:

receive a request to separate a first font preview pane from a font manager interface, wherein the first font preview pane includes first preview text in a first preview font;

in response to the request, separate the first font preview pane from the font manager interface;

set a transparency of the first font preview pane such that the preview text is visible and a text on which the first font preview pane overlays is visible, wherein the text is defined by a content data file;

displaying a second font preview pane from the font manager interface, the second font preview pane including second preview text in a second preview font;

while the first font preview pane and the second font preview pane are both displayed, receiving a request to merge the first and second font preview panes; and combining the first and second font preview panes into a third font preview pane, wherein the third font preview pane is scrollable between the first preview text in the first preview font and the second preview text in the second preview font.

16. The apparatus of claim 15, the memory further comprising instructions for:

receiving a command to insert the preview text into a document associated with the text; and in response to the command, inserting the preview text into the document.

17. The apparatus of claim 16, wherein the preview text is inserted as a bitmap.

18. The apparatus of claim 15, the memory further comprising instructions that, when executed, cause the apparatus to:

receive a command to modify the text in accordance with the preview font, wherein the text is in a font different from the preview font; and in response to the command, modify the text to the preview font.

19. The apparatus of claim 15, wherein the preview pane includes the preview text in the preview font in a plurality of different font sizes.

20. The apparatus of claim 15, the memory further comprising instructions that, when executed, cause the apparatus to:

receive a command to insert the preview text into a document associated with the text; and in response to the command, replace the text with the preview text.

21. The apparatus of claim 20, wherein the text is highlighted when the command is received.

22. The apparatus of claim 15, wherein prior to the request to separate the font preview pane from the font manager interface, the font preview pane is included in the font manager interface.

* * * * *